United States Patent
Leeman-Munk et al.

(10) Patent No.: US 12,277,409 B1
(45) Date of Patent: Apr. 15, 2025

(54) SYSTEMS, METHODS, AND GRAPHICAL USER INTERFACES FOR TRAINING A CODE GENERATION MODEL FOR LOW-RESOURCE LANGUAGES

(71) Applicant: SAS INSTITUTE INC., Cary, NC (US)

(72) Inventors: Samuel Paul Leeman-Munk, Durham, NC (US); Xiaozhuo Cheng, Cary, NC (US); Xiaolong Li, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/895,119

(22) Filed: Sep. 24, 2024

Related U.S. Application Data

(60) Provisional application No. 63/609,236, filed on Dec. 12, 2023, provisional application No. 63/601,984, filed on Nov. 22, 2023.

(51) Int. Cl.
| | |
|---|---|
| G06F 11/36 | (2006.01) |
| G06F 8/35 | (2018.01) |
| G06F 11/3604 | (2025.01) |

(52) U.S. Cl.
CPC ............ G06F 8/35 (2013.01); G06F 11/3612 (2013.01)

(58) Field of Classification Search
CPC ............................... G06F 8/35; G06F 11/3612
See application file for complete search history.

(56) References Cited

U.S. PATENT DOCUMENTS

| | | | |
|---|---|---|---|
| 2024/0086164 A1* | 3/2024 | Kramer | G06F 8/36 |
| 2024/0264809 A1* | 8/2024 | Golobokov | G06N 20/00 |

OTHER PUBLICATIONS

Jinglue Xu et al., Large Language Models Synergize with Automated Machine Learning, May 6, 2024, arXiv.org, retrieved online Nov. 20, 2024, pp. 1-49. Retrieved from the Internet: <URL: https://arxiv.org/pdf/2405.03727>. (Year: 2024).*
Mary Gathoni "7 ChatGPT Alternatives for Coding Programs Automatically," Sep. 16, 2023, MUO, pp. 1-21.
Xiao Li, "A Tutorial for Git and Github,", 2012, pp. 1-31.
Github Docs, "About Github Copliot Business," 2023, pp. 1-7.

(Continued)

*Primary Examiner* — Hanh Thi-Minh Bui
(74) *Attorney, Agent, or Firm* — Padowithz Alce; Alce PLLC

(57) ABSTRACT

A system, method, and computer-program product includes identifying a plurality of code synthesis items for a target programming language, generating a code synthesis prompt based on a first sampling of the plurality of code synthesis items, synthesizing, via a large language model, a plurality of raw code segments using the code synthesis prompt, executing the plurality of raw code segments with a code interpreter associated with the target programming language, determining one or more valid code segments of the plurality of raw code segments that the code interpreter successfully executed, aggregating, via a second sampling, the one or more valid code segments into one or more validated code synthesis training samples, and training a code generation model using the one or more validated code synthesis training samples. User interfaces may be provided to allow target coding tasks to be specified via text or speech.

30 Claims, 23 Drawing Sheets

(56) References Cited

OTHER PUBLICATIONS

Oleksandr Hutsulyak, "ChatGPT vs Copilot: Which and When to Use," TechMagic, Sep. 2023, pp. 1-21.
Li et al., "StarCoder: May the Source Be With You!," Preprint, May 2023, pp. 1-54.
Ajay Verma, "Decoding the Duel: StarCoder vs. Copilot in the World of Code Assitance," Medium, Nov. 2023, pp. 1-9.

* cited by examiner

```
examples:
    - prompt: "Print sashelp.iris"
      completion: |
          proc print data=sashelp.iris;
          run;
    - prompt : "Print the first five observations of sashelp.class"
      completion: |
          proc print data=sashelp.class(obs=5);
          run;
    - prompt : "Print observations where blood pressure is greater than 110"
      completion: |
          proc print data=mycas.patient_vitals;
             where Blood_Pressure > 110;
          run;
```

FIG. 15B

```
/*load sashelp.bei into mycas.*/
/* sashelp.bei contains the following variables: Aluminum, Ammonia, Boron,
Calcium, Copper, Elevation, Gradient, Iron, Magnesium, Manganese, MinAmmonia,
MinNitrate, MinNitrogen, Nitrate, Phosphorus, Potassium, Sodium, Sulphur,
TotalNitro, Trees, X, Y, Zinc, pH */
data mycas.bei;
set sashelp.bei;
run;
```

```
/* A dataset of utilities usage and cost */
data mycas.utilities;
    input UserID$ Month$ Year Electric_Usage_KWh NaturalGas_Usage_Thm
Water_Usage_Gal Electric_Cost NaturalGas_Cost Water_Cost;
    datalines;
U001 Jan 2020 350 25 5000 32.56 22.78 46.78
U002 Feb 2020 425 30 5500 39.47 26.44 51.34
U003 Mar 2020 395 27 5200 36.54 24.5 48.68
U004 Apr 2020 375 26 5300 34.41 24.5 49.39
U005 May 2020 400 28 5400 36.77 25.52 50.43
U006 Jun 2020 380 26 5100 35.23 24.29 47.69
U007 Jul 2020 400 27 5300 36.78 25.12 49.66
U008 Aug 2020 420 29 5500 38.79 26.68 51.43
U009 Sep 2020 410 28 5400 37.42 25.85 50.96
U010 Oct 2020 395 27 5200 36.56 24.92 48.72
;
run;
```

```
/*Connect to my cas server at xxxxxx.server.com on port 01234*/
options casport=01234 cashost="xxxx.server.com";
cas mysess;

/*Create a libref named "mycas"*/
libname mycas cas sessref=mysess;
```

Code Synthesization Prompt

1506A

System Message

You are SAS Copilot  ← 1506A1
You are a helpful code generation tool called 'SAS Copilot'.
Your code is always well-commented and looks like code
one would find in a real project.

Self-containment  ← 1506A2
If you refer to a variable, you always define that variable above.
Your code is always self-contained and presented
in one unbroken code block.

Everything you print is valid SAS code  ← 1506A3
<i>Everything you print is valid SAS code. English text is
always contained inside code comments.</i>

Code Synthesization Prompt — 1506

System Message — 1506A

========User======== — 1506B1
give 8 examples of PROC SORT — 1506B
====== assistant====== — 1506B2
/*Sort the 'account' dataset by three variables, with 'debt' in descending order, and create an output data set 'sorted' for the sorted observations.*/
proc sort data=account out=sorted;  ← 1506B2-1
   by town descending debt accountnumber;
run;
/*Sorting data 'a' using linguistic sorting and the ALTERNATE_HANDLING =SHIFTED option. Observations are ordered by variable 'x'.*/
proc sort data=a sortseq=linguistic( ALTERNATE_HANDLING=SHIFTED );  ← 1506B2-2
   by x;
run;
/*Sort observations of dataset 'sashelp.baseball' by all variables, keeping only 'division' and 'league'. Eliminate all duplicate observations and create output dataset 'DL'.*/
proc sort data=sashelp.baseball(keep=division league)out=DL NODUPKEY;  ← 1506B2-3
   by _ALL_;
run;
/*Sort observations of dataset 'account' by the values of two variables 'town' and 'company', and create an output data set 'bytown' for the sorted observation.*/
proc sort data=account out=bytown;  ← 1506B2-4
   by town company;
run;
/*Sort observations of dataset 'insurance' by the value of 'yearsworked' without maintaining the relative order with the NOEQUALS option. Create an output dataset 'byyears2'.*/
proc sort data=insurance out=byyears2 noequals;  ← 1506B2-5
   by yearsworked;
run;
/*In the following example, PROC SORT is used with linguistic sorting using ALTERNATE_HANDLING =SHIFTED and STRENGTH=4. It sorts the dataset such that "a-b" and "ab" are treated equivalently.*/
proc sort data=a sortseq=linguistic( ALTERNATE_HANDLING=SHIFTED STRENGTH=4 );  ← 1506B2-6
   by x;
run;
/*Sort observations of dataset 'account' by the variable 'town' while retaining only the first observation of each group. Create an output data set 'towns' for the sorted observation.*/
proc sort data=account out=towns nodupkey;  ← 1506B2-7
   by town;
run;
/*Sort observations of dataset 'insurance' by the value of 'yearsworked' while maintaining the relative order with the EQUALS option. Create an output dataset 'byyears1'.*/
proc sort data=insurance out=byyears1 equals;
   by yearsworked;
                                    ← 1506B2-8
run;
...

Code Synthesization Prompt

1506A

System Message

1506B

Simulated User-Assistant Code Completion Pair A

1506C

======== User ======== ← 1506C1
Give 3 examples of PROC PRINT
====== assistant ====== ← 1506C2
/*Print observations where blood pressure is greater than 110*/
proc print data=mycas.patient_vitals;
where Blood_Pressure > 110; ← 1506C2-1
run;
/*Print sashelp.iris*/
proc print data=sashelp.iris; ← 1506C2-2
run;
/*Print the first five observations of sashelp.class*/
proc print data=sashelp.class(obs=5);
run; ← 1506C2-3

1506D

======== User ======== ← 1506D1
Generate 10 diverse examples of proc print focusing on examples using the sashelp/iris dataset.
Prior Context ← 1506D2
/*Connect to my cas server at xxxxxx.sas.com on port 01234*/
options casport=01234 cashost="xxxxxxx.sas.com";
cas mysess;
/*Create a libref named "mycas"*/ ← 1506D2-1
libname mycas cas sessref=mysess;
/*load sashelp.IRIS into mycas.*/ ← 1506D2-2
/* sashelp.IRIS contains the following variables:
PetalLength, PetalWidth, SepalLength, SepalWidth, Species */
data mycas.IRIS;
set sashelp.IRIS;
run;

FIG. 15E
(Continued)

SYSTEMS, METHODS, AND GRAPHICAL USER INTERFACES FOR TRAINING A CODE GENERATION MODEL FOR LOW-RESOURCE LANGUAGES

CROSS-REFERENCE TO RELATED APPLICATIONS

This application claims the benefit of U.S. Provisional Application No. 63/601,984, filed on 22 Nov. 2023, and U.S. Provisional Application No. 63/609,236, filed on 12 Dec. 2023, which are incorporated in their entireties by this reference.

TECHNICAL FIELD

This invention relates generally to the machine learning field and, more specifically, to new and useful systems and methods for training a code generation model for low-resource languages based in part on generated/synthetic training data.

BACKGROUND

In software development, code generation in programming languages is an important task that can require significant human effort and expertise. Due to rapid advancements in generative machine learning model sizes, "code copilot" chat models have emerged as a widely-adopted tool for assisting software developers across various industries. Commonly and commercially available code copilot chat models are often trained on data primarily sourced from the internet and are therefore biased in favor of servicing user requests for functional code requests in internet-dominant programming languages (i.e., programming languages with an abundance of internet-accessible discussion, documentation, and example code).

A user request for functional code in a low-resource or scarcely-documented language (i.e., language without an abundance of discussion, documentation, and example code publicly available on the internet) is therefore currently underserved by currently-available code copilot chat models. Users requesting code in such low-resource and scarcely-documented programming languages include developers and operators in various critical industries and applications, and existing code generation tools do not suitably serve or support these users. In particular, currently-available code copilot chat models may provide incorrect, invalid, or otherwise inferior code responses to user requests in said languages (e.g., code responses failing to correctly utilize or completely implement unique features and functionalities of the languages), relative to the responses of models in internet-dominant programming languages. For at least these reasons, existing code copilot chat models are unsuited to software development in scarcely-documented or low-resource programming languages and may generate responses containing more development problems than solutions for a requesting user, especially one who is naïve to the languages.

Accordingly, there is an unmet need for new and improved systems and methods that enable and enhance the generation of functional code in scarcely-documented languages, in response to user requests. The embodiments of the present application provide technical solutions that at least address the needs described above, as well as the deficiencies of the state of the art.

BRIEF SUMMARY OF THE INVENTION(S)

In some embodiments, a computer-program product comprising a non-transitory machine-readable storage medium storing computer instructions that, when executed by one or more processors, perform the following operations. Executed instructions may function or otherwise operate by identifying a plurality of code synthesis items for a target programming language, generating a code synthesis prompt based on a first sampling of the plurality of code synthesis items, synthesizing, via a large language model, a plurality of raw code segments using the code synthesis prompt, and executing the plurality of raw code segments with a code interpreter associated with the target programming language. Executed instructions may further function or otherwise operate by determining one or more valid code segments of the plurality of raw code segments that the code interpreter successfully executed, aggregating, via a second sampling, the one or more valid code segments into one or more validated code synthesis training samples, and training a code generation model using the one or more validated code synthesis training samples. Executed instructions such as the ones mentioned above may be termed a computer-implemented method, and may be executed using computing resources such as one or more processors and a memory that are operably coupled to the computer- or machine-readable medium on which the instructions are stored.

In some embodiments, the one or more valid code segments are stored in an iterable data structure, and the executed instructions may further function or otherwise operate by aggregating the one or more valid code segments into the one or more validated code synthesis training samples includes iterating through one or more indices of the iterable data structure. An iteration for a first respective index of the iterable data structure may include determining, via the second sampling, a first number of valid code segments to obtain from the iterable data structure, obtaining, from the iterable data structure, a first set of valid code segments starting from the first respective index and corresponding to the first number of valid code segments, and generating a first validated code synthesis training sample that includes the first set of valid code segments obtained from the iterable data structure.

In some embodiments, the second sampling may use a Poisson distribution to determine the first number of valid code segments to obtain from the iterable data structure. In some embodiments, the code synthesis prompt may include a partial user-assistant code completion pair that specifies prior context data, including: a pre-defined boilerplate header associated with the target programming language, and pre-defined code for instantiating a respective dataset in the target programming language. In such embodiments, generating the first validated code synthesis training sample may further include pre-pending the pre-defined boilerplate header and the pre-defined code to the first validated code synthesis training sample. In some embodiments, an iteration for a second respective index of the iterable data structure may include determining, via the second sampling, a second number of valid code segments to obtain from the iterable data structure, obtaining, from the iterable data structure, a second set of valid code segments starting from the second respective index and corresponding to the second number of valid code segments, and generating a second validated code synthesis training sample, different from the first validated code synthesis training sample, that includes the second set of valid code segments obtained from the iterable data structure.

In some embodiments, generating the code synthesis prompt may include generating a system message, generating one or more simulated user-assistant code completion pairs for one or more features of the target programming language, and generating a partial user-assistant code completion pair for a respective feature of the target programming language. In such embodiments, the plurality of code synthesis items may include a collection of example code segments for the respective feature of the target programming language. In such embodiments, generating a respective simulated user-assistant code completion pair based on the first sampling of the plurality of code synthesis items may include generating a simulated user message that instructs the large language model to synthesize a respective number of example code segments for the respective feature of the target programming language, randomly sampling the respective number of example code segments from the collection of example code segments, and generating a simulated code assistant response message that responds to the simulated user message with the respective number of example code segments randomly sampled from the collection of example code segments.

In some embodiments, the plurality of code synthesis items may include a collection of datasets instantiated in the target programming language and a pre-defined boilerplate header for the target programming language. In such embodiments, generating the partial user-assistant code completion pair based on the first sampling of the plurality of code synthesis items may include randomly sampling a dataset from the collection of datasets instantiated in the target programming language, generating a user message that instructs the large language model to synthesize a respective number of example code segments for the respective feature of the target programming language using the dataset randomly sampled from the collection of datasets, and adding, to the user message, prior context data that includes the pre-defined boilerplate header for the target programming language and pre-defined code for instantiating the dataset in the target programming language.

In some embodiments, generating the system message may include adding one or more instructions to the system message, and the one or more instructions of the system message may instruct the large language model to operate as a code generation model, produce self-contained code that adheres to syntactical requirements of the target programming language, and generate comments for the self-contained code that explain one or more features of the self-contained code. In some embodiments, a respective simulated user-assistant code completion pair of the one or more simulated user-assistant code completion pairs may include a simulated user message that instructs the large language model to synthesize a respective number of code segments for a target feature of the target programming language, and a simulated code assistant response message that responds to the simulated user message with the respective number of code segments.

In some embodiments, the plurality of code synthesis items may include a collection of example code segments for a respective feature of the target programming language, a collection of datasets instantiated in the target programming language, and a pre-defined boilerplate header for the target programming language. In some embodiments, the code synthesis prompt may include a partial user-assistant code completion pair that instructs the large language model to synthesize a respective number of example code segments for a respective feature of the target programming language. In such embodiments, synthesizing, via the large language model, the plurality of raw code segments using the code synthesis prompt may include synthesizing the plurality of raw code segments based on the respective number of example code segments requested for the respective feature in the partial user-assistant code completion pair.

In some embodiments, synthesizing the plurality of raw code segments may include synthesizing a code assistant response message that includes the plurality of raw code segments, and the computer instructions, when executed by the one or more processors, may extract the plurality of raw code segments from the code assistant response message. In such embodiments, the code assistant response message may separate the plurality of raw code segments by code comments, and extracting the plurality of raw code segments from the code assistant response message may include extracting the plurality of raw code segments using the code comments as delimiters.

In some embodiments, the code synthesis prompt includes a partial user-assistant code completion pair that specifies prior context data, and executing a respective raw code segment of the plurality raw code segments with the code interpreter may include providing the respective raw code segment and the prior context data to the code interpreter, and executing, via the code interpreter, the respective raw code segment in association with the prior context data. In such embodiments, the prior context data specified within the partial user-assistant code completion pair may include a pre-defined boilerplate header associated with the target programming language, and pre-defined code for instantiating a respective dataset in the target programming language.

In some embodiments, a respective valid code segment corresponds to a raw code segment of the plurality of raw code segments that executed in the code interpreter without an error. In some embodiments, the code generation model may be configured to receive natural language input specifying a target coding task, and to generate code in the target programming language that implements the target coding task. In some embodiments, the computer instructions, when executed by the one or more processors, may receive, via an interface in operative communication with the code generation model, an input specifying a target coding task in natural language. Based on receiving the input, the executed instructions may further function or otherwise operate by providing, to the code generation model, a prompt that comprises the input, and returning, via the code generation model, a response to the prompt that includes code implementing the target coding task in the target programming language by displaying the response to the prompt via the interface in operative communication with the code generation mode. The interface in operative communication with the code generation model may be one of: a command line interface (CLI), an application programming interface (API), or a graphical user interface (GUI).

In some embodiments, a respective validated code synthesis training sample of the one or more validated code synthesis training samples may at least include a natural language description of a target coding task, and one or more code segments that implement the target coding task. In such embodiments, training the code generation model may include using supervised learning to train the code generation model, and the supervised learning may cause the code generation model to learn to map the natural language description of the target coding task to the one or more code segments that implement the target coding task.

Executed instructions such as the ones mentioned above may be termed a computer-implemented method, and may be executed using computing resources such as one or more processors and a memory that are operably coupled to the computer- or machine-readable medium on which the instructions are stored. This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

BRIEF DESCRIPTION OF THE FIGURES

FIG. 15B illustrates exemplary code segments containing user-assistant prompts for code in a target programming language and corresponding code completions, according to some embodiments of the present technology.

FIG. 15C illustrates exemplary predefined datasets containing an external dataset reference and an inline dataset definition, according to some embodiments of the present technology.

FIG. 15D illustrates exemplary predefined boilerplate headers for accessing network services and referencing libraries, according to some embodiments of the present technology.

FIG. 15E illustrates component messages and code examples of an exemplary code synthesis prompt, according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

Example Systems

Systems depicted in some of the figures may be provided in various configurations. In some embodiments, the systems may be configured as a distributed system where one or more components of the system are distributed across one or more networks in a cloud computing system.

Figure 1:
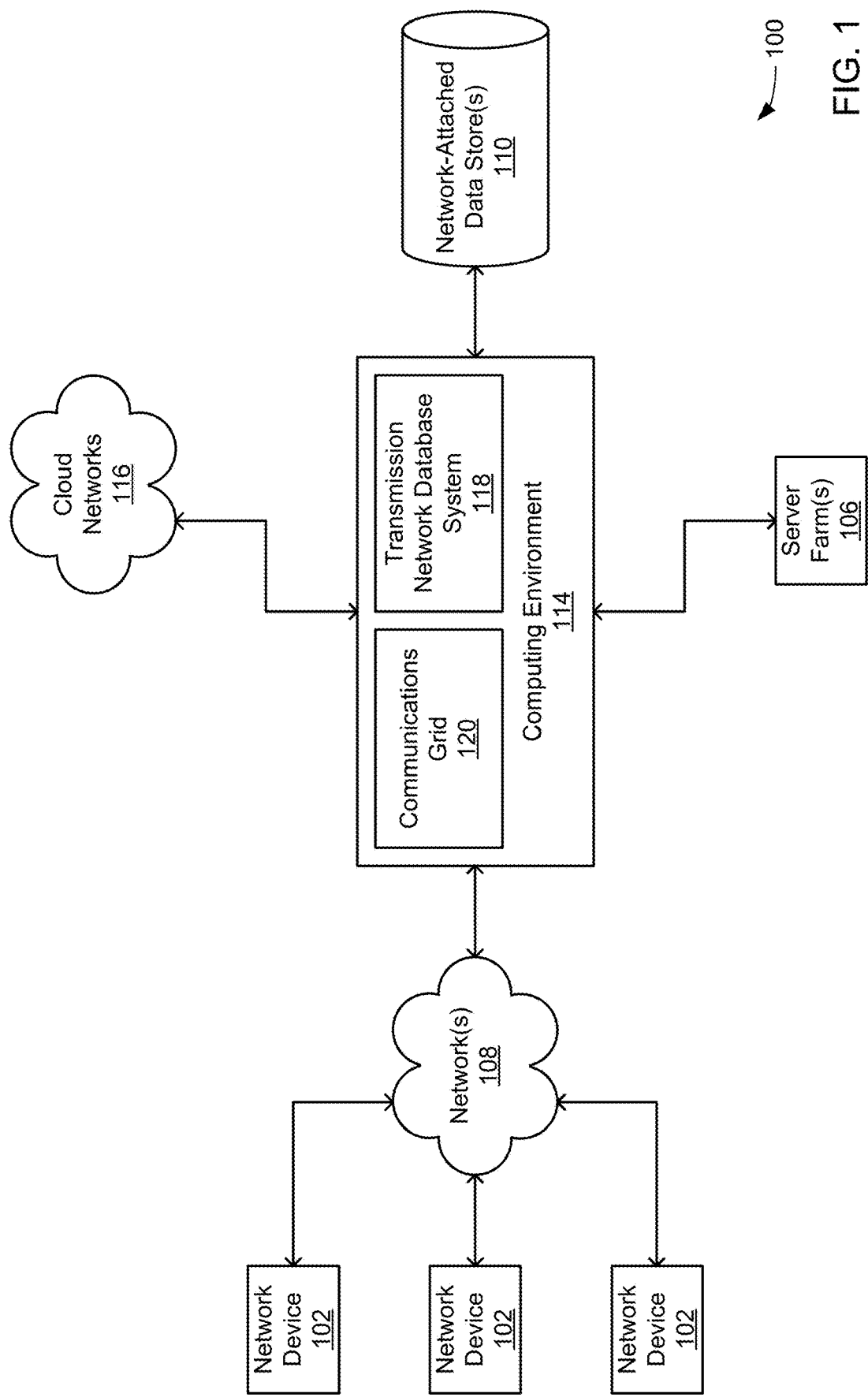
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
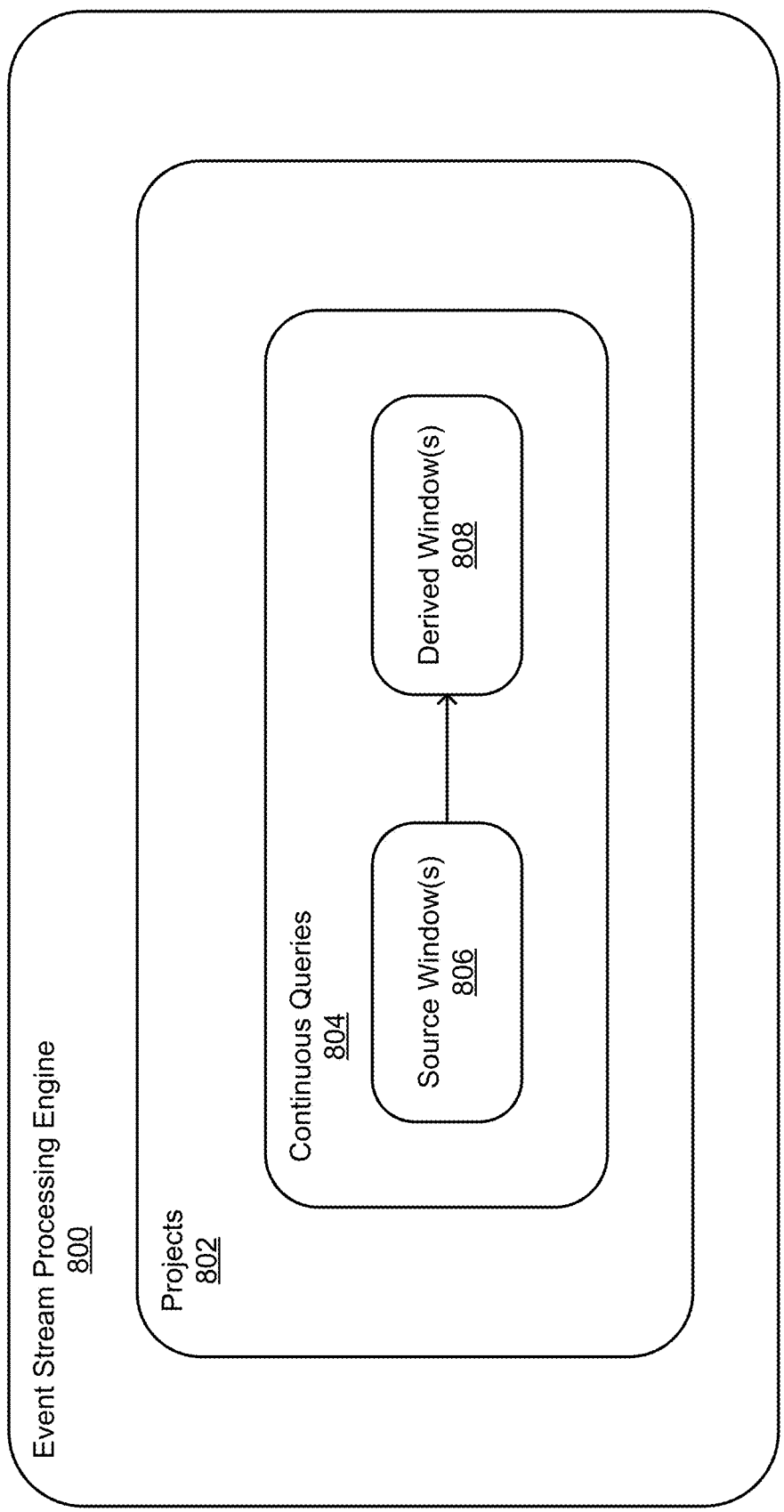
FIG. 8 illustrates a block diagram including components of an Event Stream Processing Engine (ESPE), according to some embodiments of the present technology.
Figure 9:
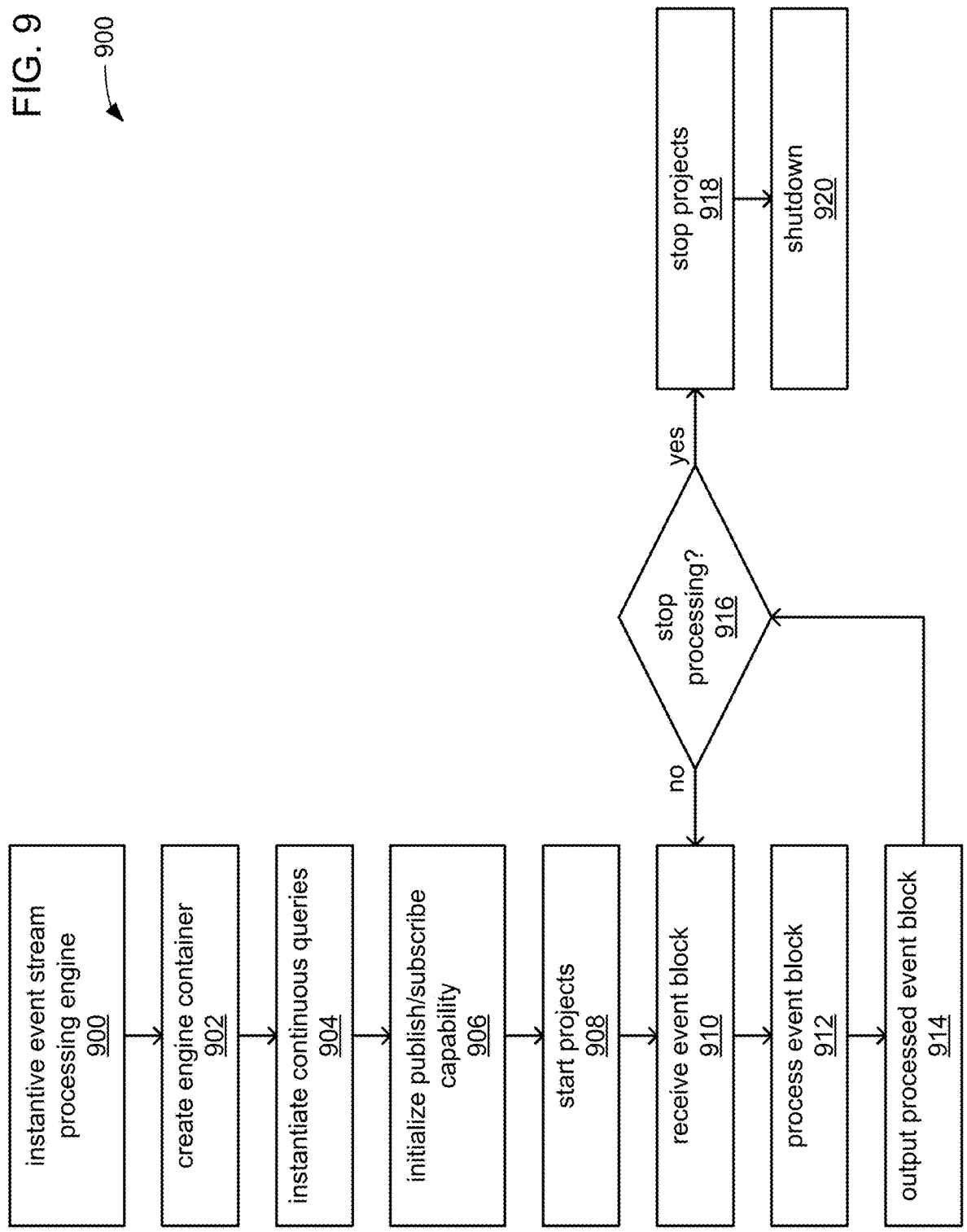
FIG. 9 illustrates a flow chart showing an example process including operations performed by an event stream processing engine, according to some embodiments of the present technology.
Figure 10:
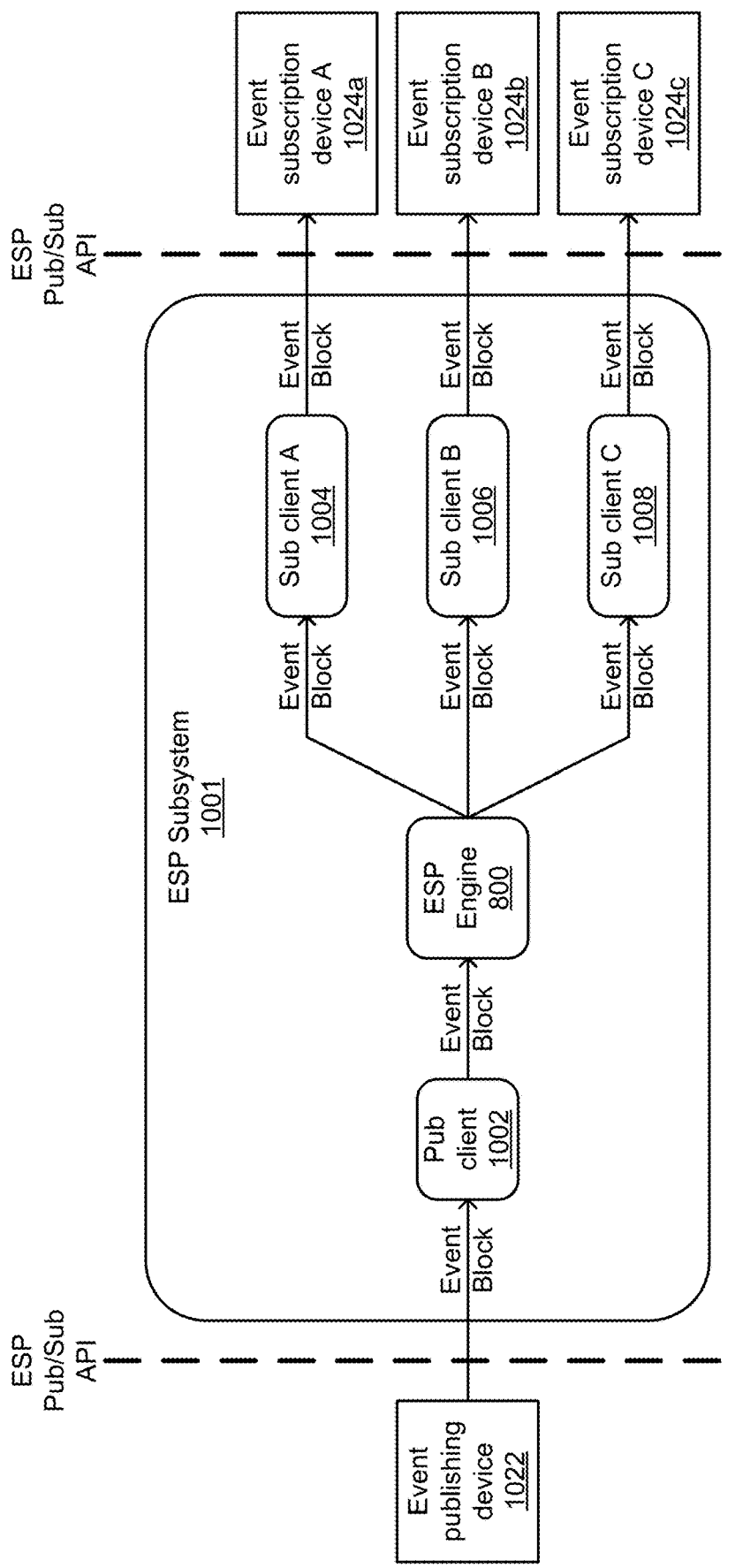
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 18 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
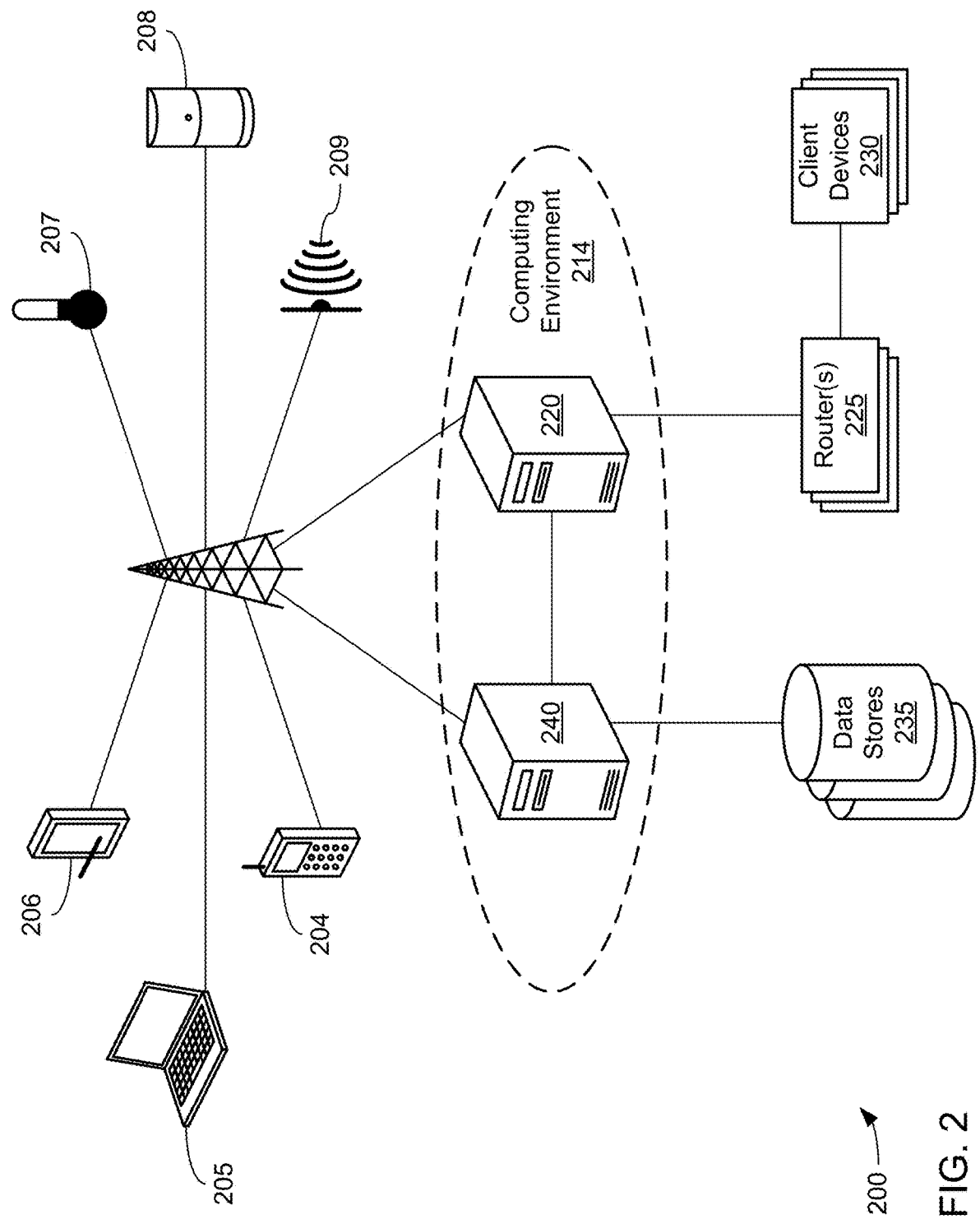
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
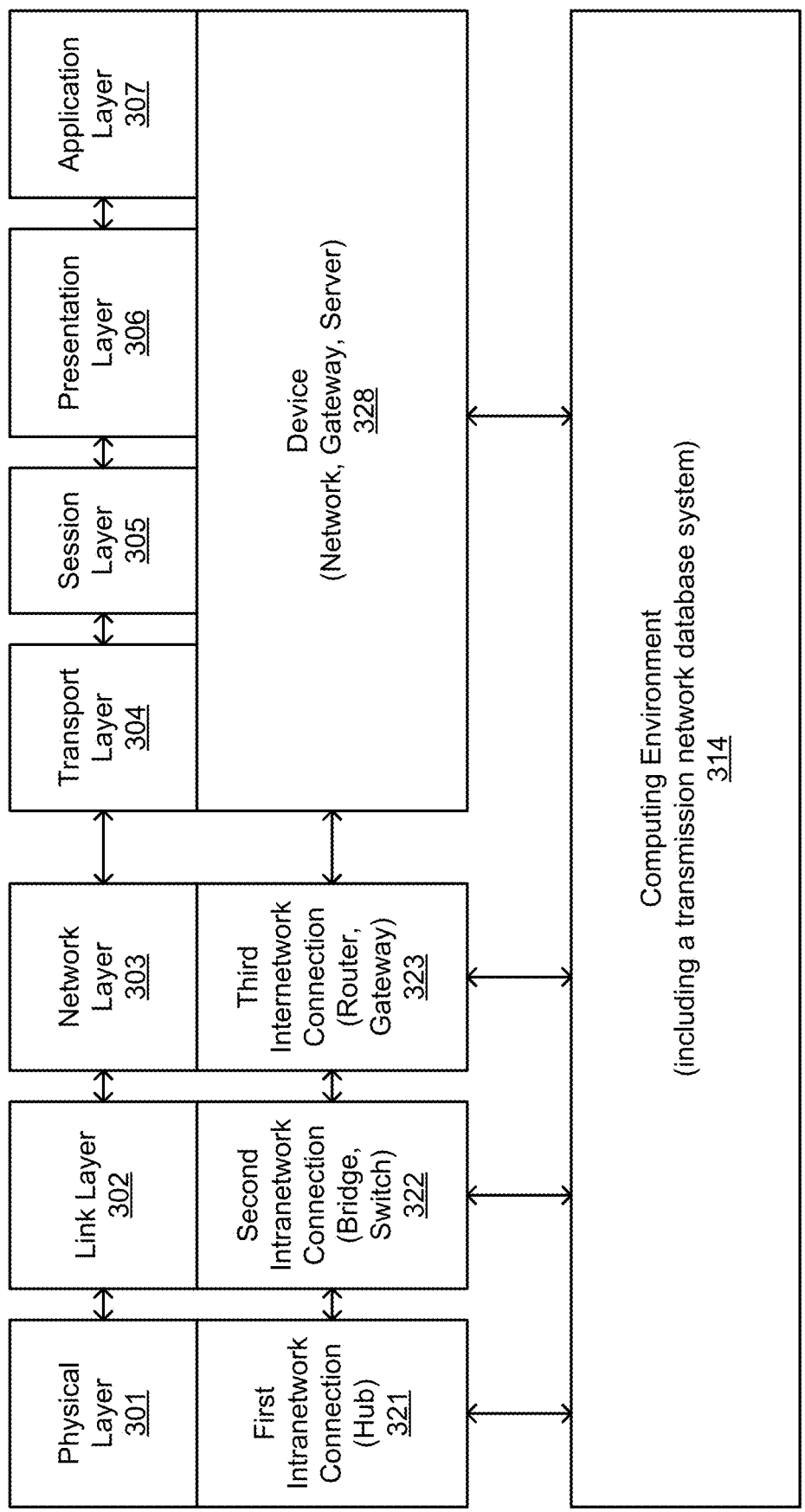
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
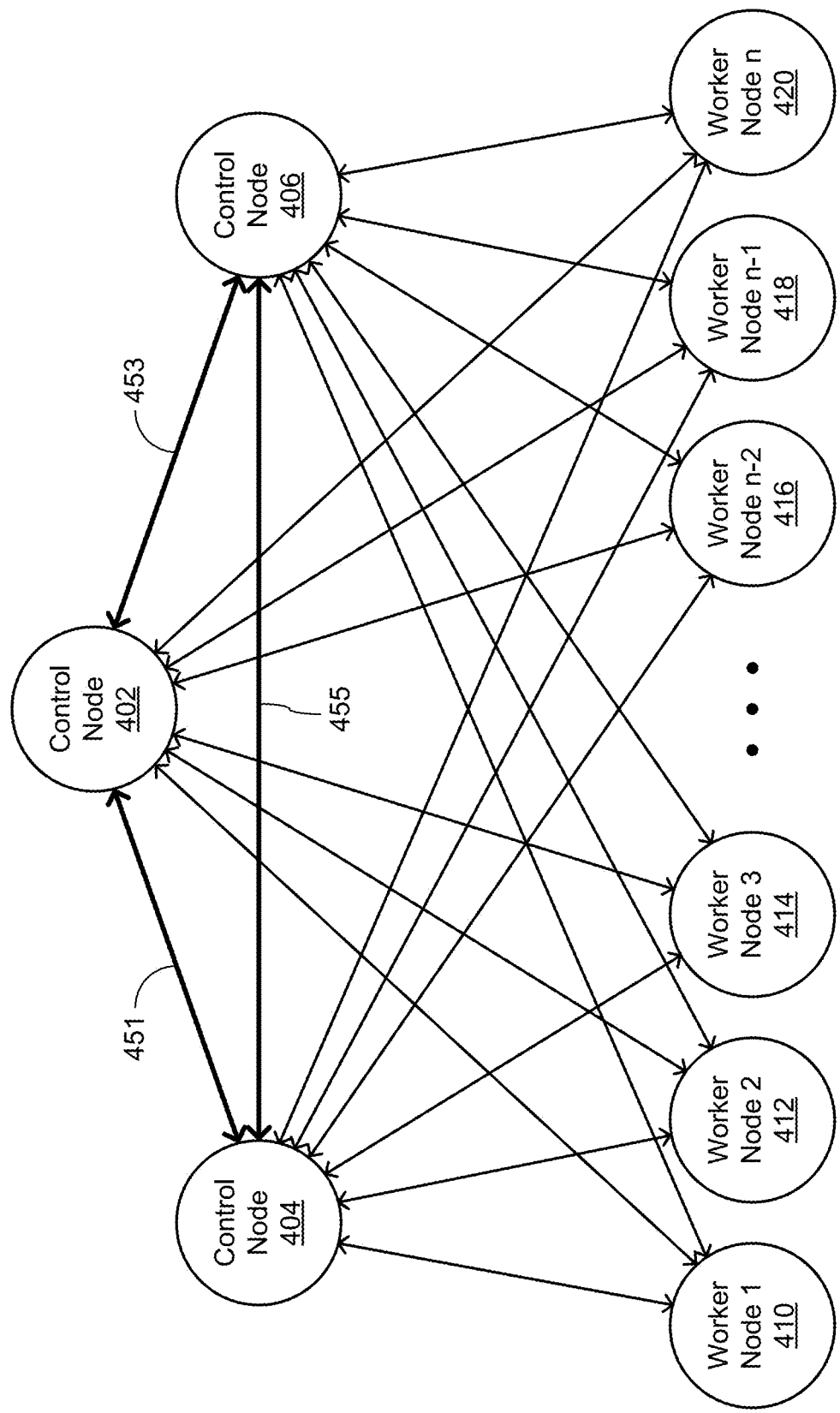
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420.

Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
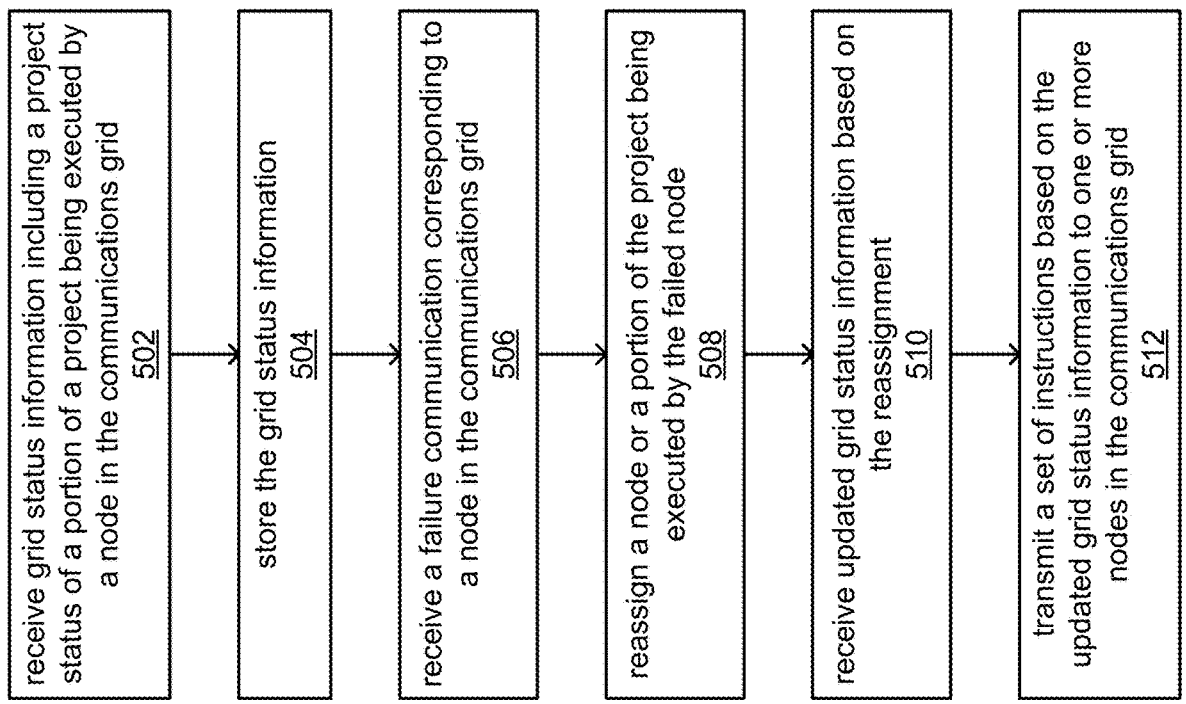
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
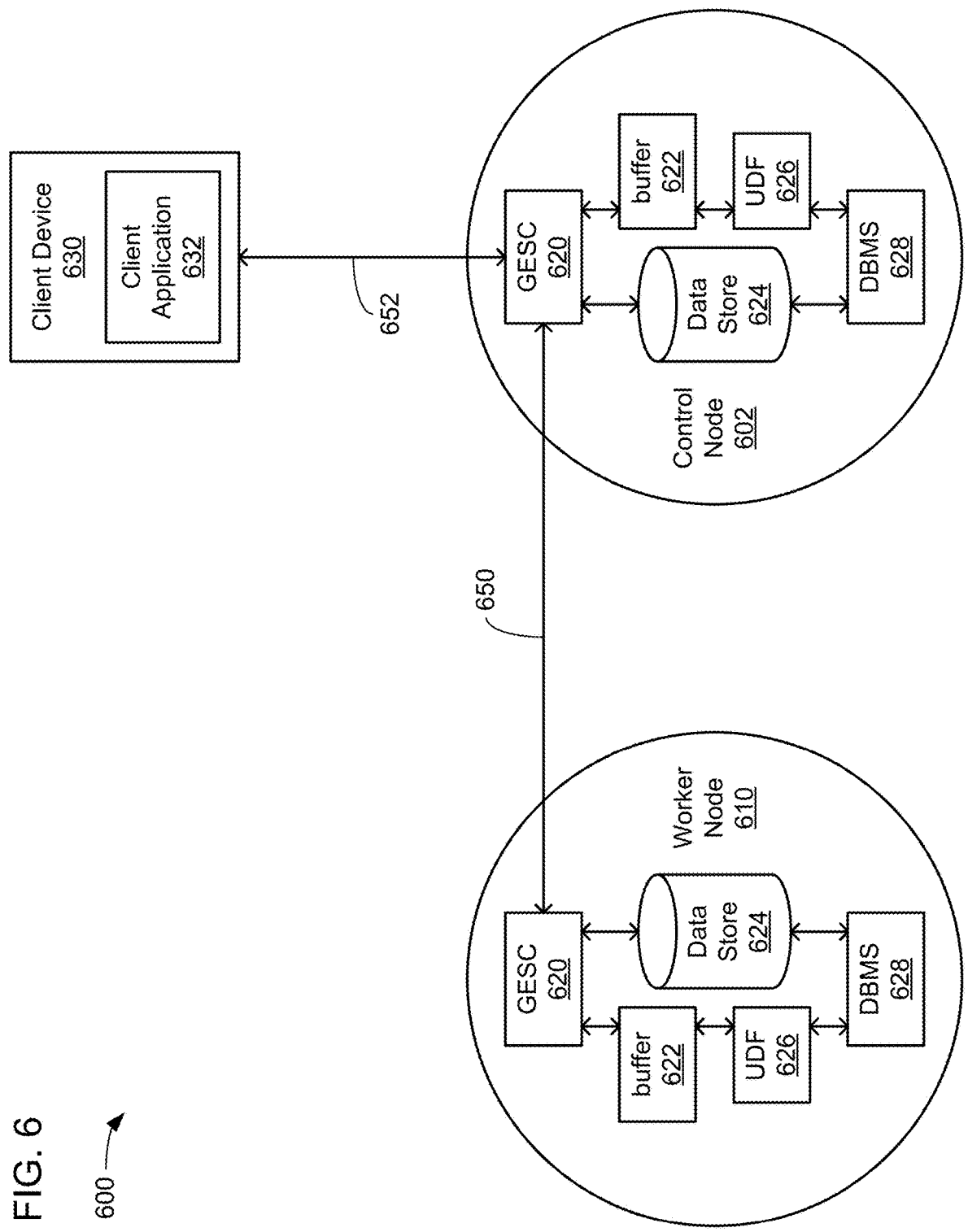
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
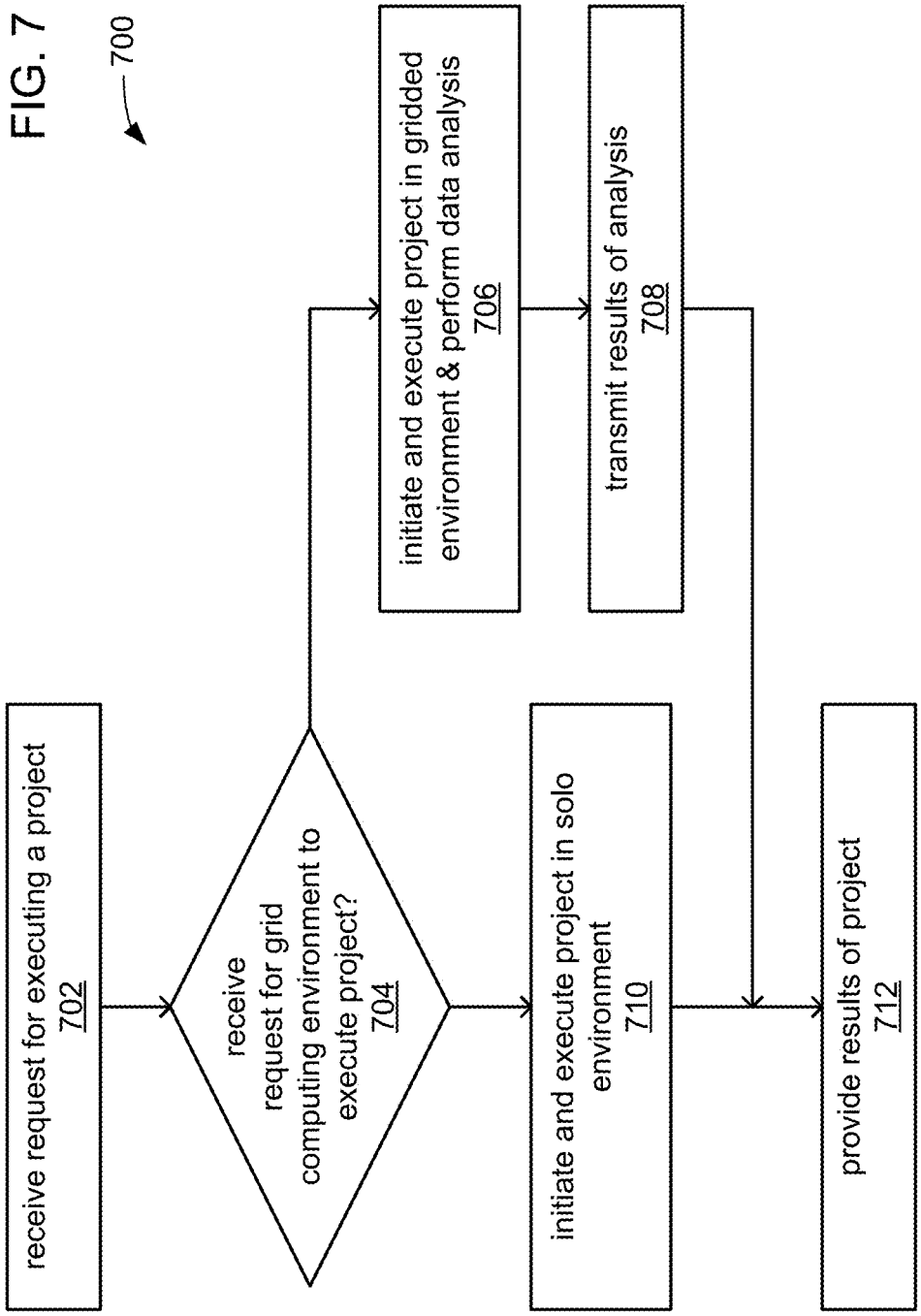
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
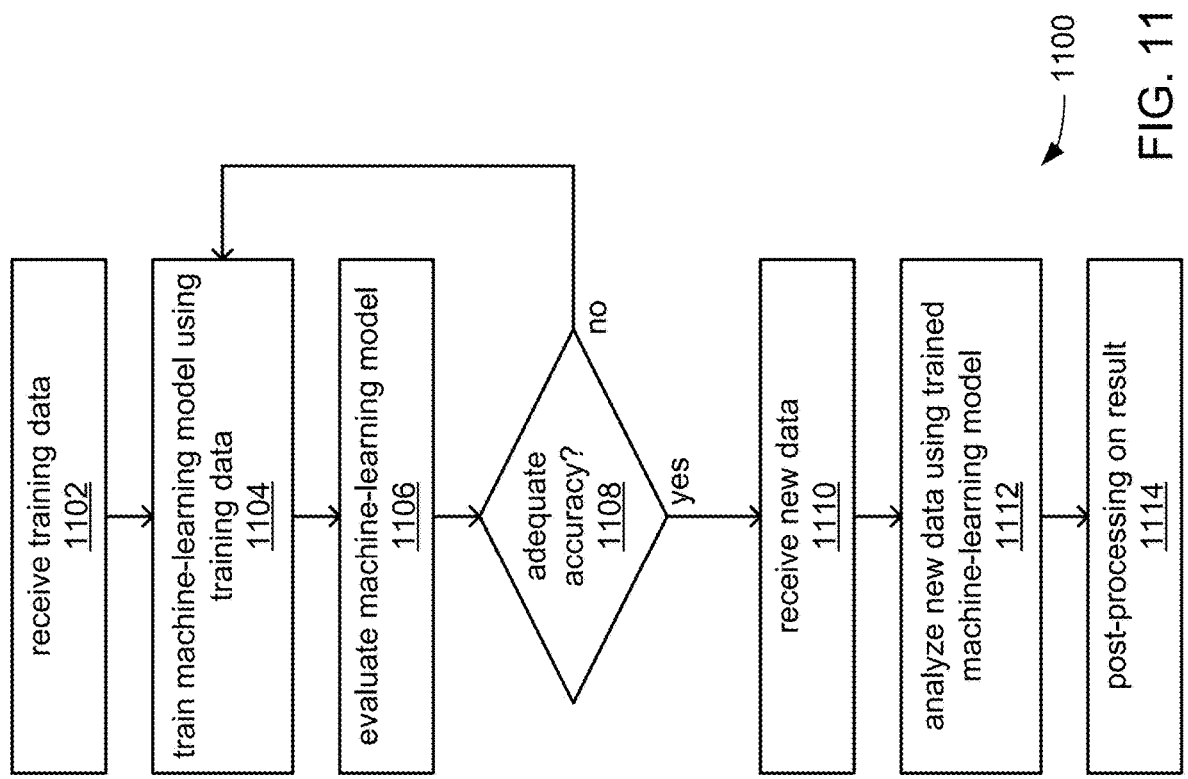
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
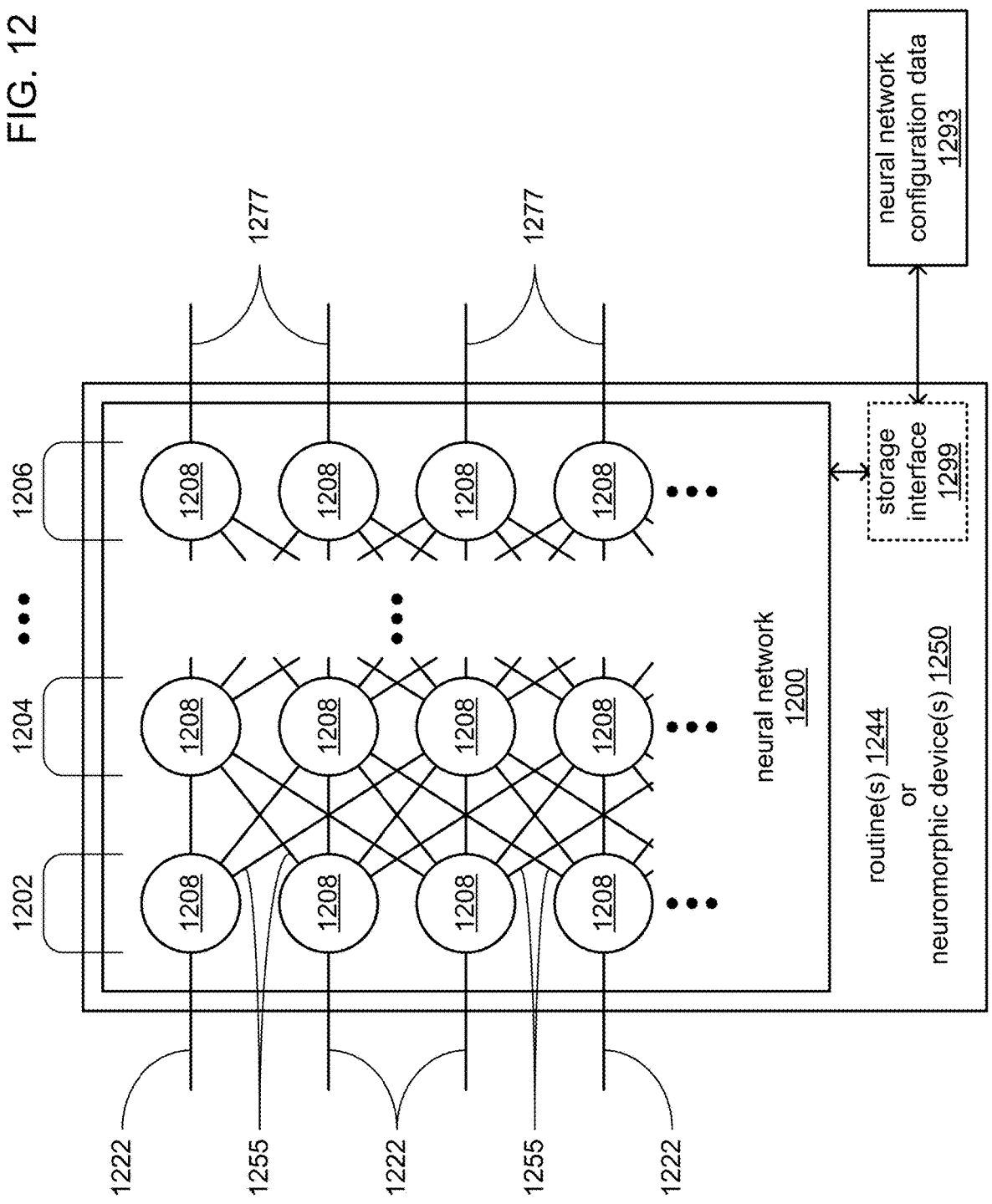
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
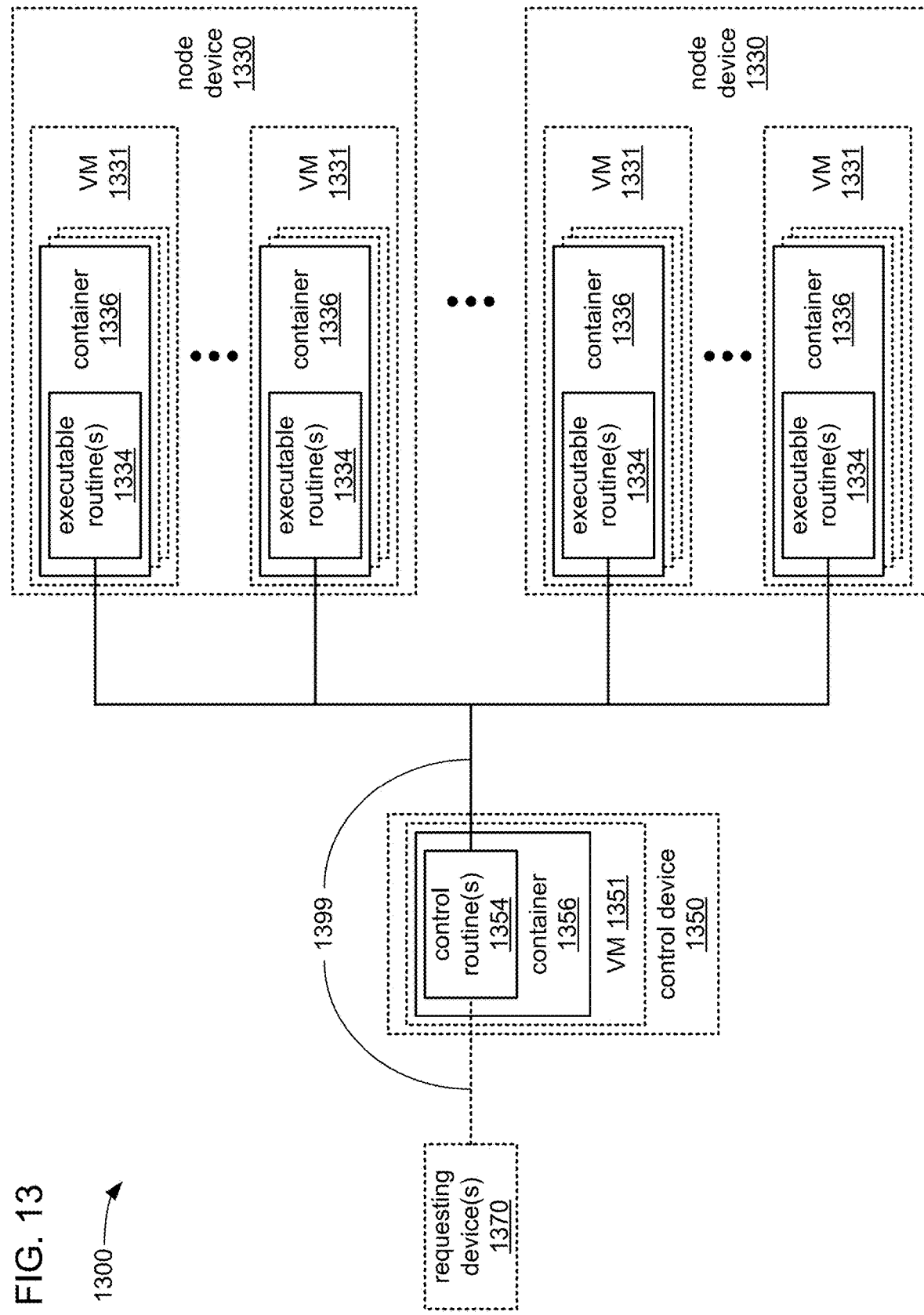
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages.

In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Figure 14:
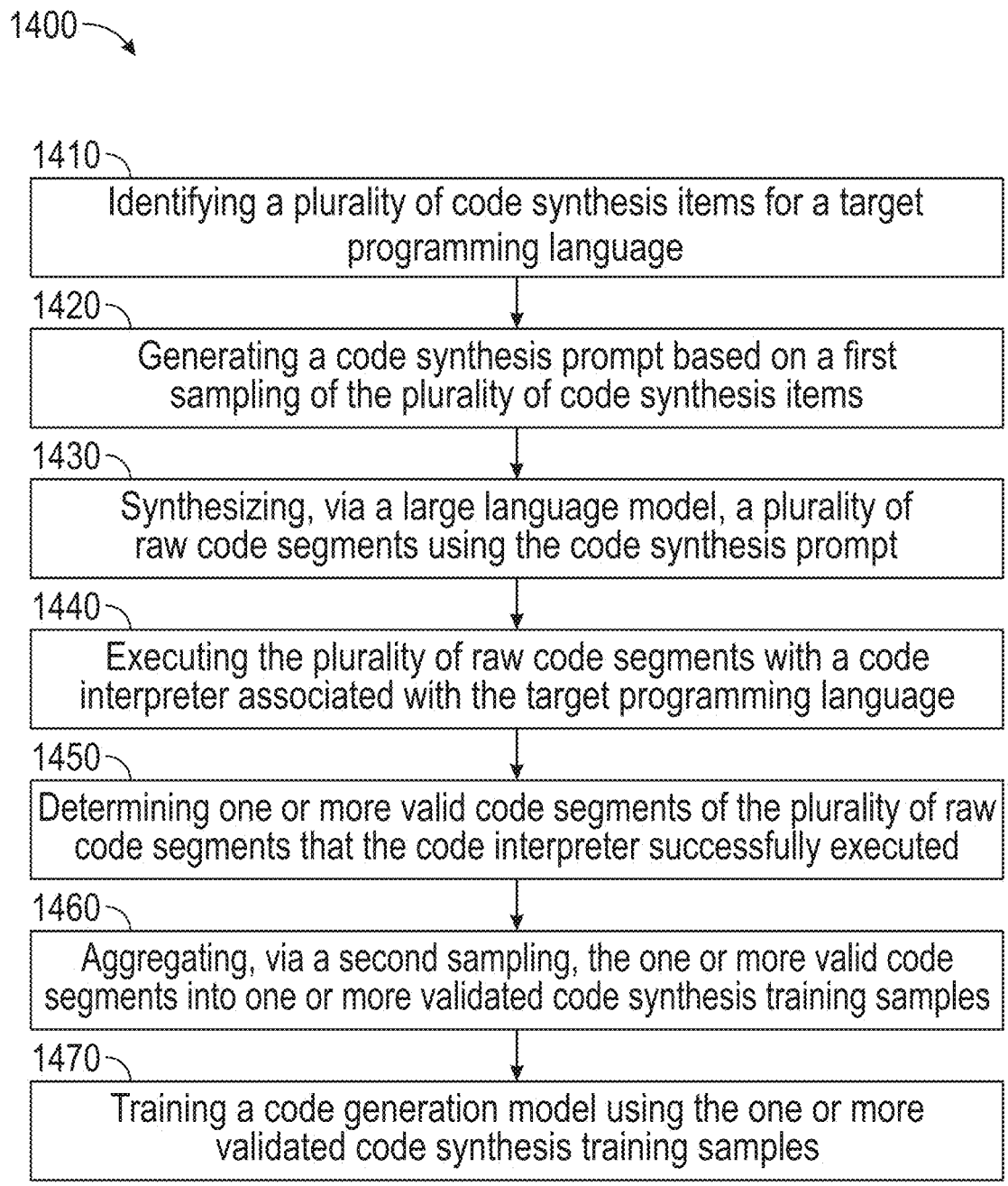
FIG. 14 illustrates an exemplary flowchart of a method for generating a training set of validated code segments used to produce a generative user-assistant tool for a target programming language, according to some embodiments of the present technology.

FIG. 14 illustrates an example of method 1400 executing processes that leverage code synthesis items and a large language model to generate suitable training data samples for a user-assistant tool that can serve user requests for functional code in a target programming language, which is usually a low-resource or scarcely-documented programming language. Method 1400 may also include the training of a code generation model (e.g., a machine learning model capable of generating code in response to requests) based on the suitable training data samples generated by the system that performs method 1400. It shall be appreciated that other embodiments contemplated within the scope of the present disclosure may involve more processes, fewer processes, different processes, or a different order of processes than illustrated in FIG. 14.

In at least the process of training a code generation model based on generated training data from method 1400, the system performing the method may perform operations such as generating, maintaining, and updating thousands of machine-learning model weights, parameters, hyperparameters, and other parametric features of the specific machine-learning model architecture. These operations entailed by the training of a code generation model may include the manipulation of computer data structures in manners that improve the functioning of the computers that execute the models. Computer execution of user-assistant tools for code generation may be improved by the iterative generation of code generation model parameters on the basis of the generated training data, where the final model parameters reduce the computational complexity of serving future user requests in a target programming language. The disclosed system and methods realize an improvement in accuracy and validity of generated code in low-resource or scarcely-documented programming languages relative to conventionally-trained large language models adapted to such purposes, at least due to the selective and specific processes used to generate and compose training data discussed below in connection with the presented embodiments. A code generation model capable of serving user requests for functional code with higher accuracy, and greater validity (such as the disclosed code generation model) realizes an improvement in the current state-of-the-art of user-assistant tools for software development, which employs large language models to generate code in a target programming language using either neurons and encoded information based on other programming languages than the target, or insufficient/scarce documentation for the target programming language that fails to capture or produce compilable code corresponding to nuances or user-requested features specific to the target programming language. Improvements to the current state-of-the-art represented by the embodiments disclosed herein may correspond to improved and more resilient code generation in target programming languages that may be considered low-resource or scarcely-documented languages, as well as more targeted and computationally compact code generation models that are tailored to the target programming languages, and that are capable of generating code that can be compiled by requesting users without further (manual) modifications to the code generation model output. More specifically, the validation or determinations of validity operations performed with respect to synthetic code prior to being used as training data (performed by the method at process 1450) improve the performance of the disclosed code generation model, such that results of the code generation model provided to requesting users are more likely to compile, and more likely to correctly capture requested features in the target programming language. As a result of these improvements to the performance of the disclosed code generation model, any user-assistant tool that serves user requests based on said model can be considered to result in fewer failed code compilations, and more efficient computing resources to generate user-requested code relative to the state-of-the-art.

Method 1400 begins with process 1410, which may function to identify a plurality of code synthesis items for a target programming language. Code synthesis items may generally refer to segments (sometimes referred to as "snippets") of code in the target programming language, which is usually a low-resource or scarcely-documented programming language in accordance with the embodiments presented herein. Examples of low-resource or scarcely-documented programming languages may include: SAS, Ada, or COBOL, Fortran, ABAP, RPG, LabVIEW, VHDL, MATLAB, or LITI. Additional examples of low-resource of scarcely-documented programming languages may include: Julia, Golang, Haskell, Erlang, and Scala. Presently disclosed embodiments may also be adapted to a target markup language or other computer-readable or computer-interpretable languages, such as: LaTeX, Maple, Magma, and Maxima. However, it shall be understood that the systems and methods of the presently disclosed embodiments may be applicable to any language that can be reasonably termed low-resource or scarcely-documented, relative to internet-dominant languages with abundant documentation, such as: Python, HTML, or JavaScript. It shall also be understood that the systems and methods of the presently disclosed embodiments may be applicable to libraries of parent languages that could be considered internet-dominant with abundant documentation, where said libraries could be considered low-resource or scarcely-documented relative to the parent language, such as: NumPy, SciPy, or SymPy libraries, which may be considered low-resource or scarcely-documented relative to the parent language of Python.

Code synthesis items may more specifically refer to any set of code segments capable of forming a basis from which user-requested features of the target programming language can be adapted, derived, or otherwise generated by a code generation model trained on said code synthesis items. Code synthesis items may therefore correspond to not only code segments that explicitly perform certain functions (e.g., functions corresponding to user requests), but also to code segments that perform auxiliary functions that enable or otherwise support the certain functions (e.g., segments containing dataset, library, or other supporting references to resources required to support the user-requested functions). Whereas conventional code generation models, such as models that generate code in internet-dominant languages such as Python, may utilize a vast number of publicly available (e.g., via the internet) code examples as a basis for training their models, the same, or even a comparably vast number of publicly available code examples may not be available for low-resource or scarcely-documented programming languages. Therefore, the same training methodology used for training conventional code generation models that generate code in internet-dominant languages may be inapplicable to programming languages considered low-resource or scarcely-documented. Code synthesis items identified by process 1410 may include some manually-composed or human generated code examples that are not publicly available, with said examples being produced solely for inclusion in the code synthesis items identified by process 1410. Code synthesis items identified by process 1410 may be used generally as a basis for generating synthetic code for training a large language model or other machine-learning model configured for generating code in a target programming language (sometimes referred to as a user-assistant tool, a code completion tool, a code copilot/companion tool, etc.) in response to user requests.

Identification activities associated with process 1410 may be performed with user-assistance, according to some embodiments in which a user is prompted to identify or provide relevant code documentation, code discussion, code examples, or source locations of the same, for use as the basis of synthesis for training samples used by the user-assistant tool in its training by method 1400. According to some other embodiments, identification activities associated with process 1410 may be performed fully autonomously by an identification agent or other training system component that is provided a source location for relevant code documentation, code discussion, or code examples, and that is tasked with scraping and processing relevant code portions into machine-readable or machine-processable formats for use as the basis of synthesis for training samples used by the user-assistant tool in its training by method 1400. In some embodiments, identification activities associated with process 1410 may include accessing a source location, retrieving relevant code portions, and aggregating stored code in partitions or storage domains corresponding to code portions in the target programming language with the corresponding role for each portion of code. The code synthesis items may include example code snippets, datasets, boilerplate code, etc. for the target programming language (described further in connection with code synthesis items 1502 of FIG. 15A).

In process 1420, based on a first sampling of the plurality of code synthesis may be items, a code synthesis prompt may be generated. The code synthesis prompt may generally be configured to instruct a large language model to generate new code segments, based on a selected subset of the code synthesis items. A code synthesis prompt may include multiple formatted sub-prompts, corresponding to different respective contexts being specified to the large language model by the code synthesis prompt. As an example, a code synthesis prompt may include natural language (i.e., conversational English) statements addressed to a large language model as a system (i.e., instructions to the system that are separate, but relevant to the request for synthetically generated code segments of the code synthesis prompt). Example sub-prompts addressed to the large language model as a system can include an identity prompt, a code convention prompt, and a target language prompt (described further in connection with system message 1506A of FIG. 15E). Generally, such sub-prompts to the large language model system may specify different response formats which are expected from the large language model system by the system performing method 1400. A large language model receiving the code synthesization prompt may be expected to produce output that conforms to all of the sub-prompts it was provided, adhering to instructions, context, or simulated data in the provided order.

In addition to including system-level statements addressed to the large language model, a code synthesis prompt may include formatted simulations of user-interactions with a code-completion or user-assistant tool (described further in connection with simulated user-assistant code completion pairs A 1506B and B 1506C). Formatted simulations of user-interactions with a code-completion or user-assistant tool may be based on code synthesis items identified by process 1410. In particular, a sampling of the plurality of code synthesis items may be used in generating the formatted simulations of user-interactions. A code synthesis prompt may include any number of formatted simulations of user-interactions with a code-completion or user-assistant tool and said formatted simulations of user-interactions may serve as context for the actual code synthesis request. Following the formatted simulations of user-interactions, a code synthesis prompt may include a particular request for a plurality of raw code segments from the large language model. This particular request for a plurality of raw code segments may be considered to take the entire foregoing portion of the code synthesis prompt (i.e., the system-level statements, and formatted simulations of user-interactions) as "context," or information that indirectly influences the output, for the large language model. The particular request for a plurality of raw code segments may specify a particular number of raw code segments that the large language model should generate (i.e., one, two, three segments, etc.), as well as the nature of the raw code segments (i.e., segments that incorporate a first, second, third feature, etc.).

At process 1430, a plurality of raw code segments may be synthesized via a large language model using the code synthesis prompt. For example, the large language model (e.g., GPT-3) may process the code synthesis prompt and generate a plurality of raw code segments that conform to a format expected by a compiler of the target programming language. The plurality of raw code segments may be generated in a quantity intended to cover different features and use cases of the target programming language, with respect to each particularly-requested feature in the code synthesis prompt.

By process 1430, the large language model may first process the code synthesis prompt in stages, such that the large language model is configured in a first configuration in response to processing a first stage of the code synthesis prompt (e.g., a system message), in a second configuration in response to processing a second stage of the code synthesis prompt (e.g., simulated user-interactions), and in a third configuration in response to processing a third stage of the code synthesis prompt (e.g., particular requests for a plurality of raw code segments). An example of configuration changes in response to processing the code synthesis prompt in stages, may be the modification of an internal data structure representation (e.g., tokens, embeddings, etc. corresponding to an internal representation of the code synthesis prompt) maintained in non-transitory storage by the code generation model, by weight parameters of an attention mechanism used by the large language model in processing the code synthesis prompt. Attention mechanisms used by the large language model may include self-attention, cross-attention, multi-headed attention, sparse attention, block-wise attention, linformer, reformer, ring, longformer, and adaptive attention span mechanisms. The internal representation of the input (i.e., code synthesis prompt) maintained by the large language model may correspond to a computer data structure representation of the code synthesis prompt, and may be iteratively or successively transformed by the respective embedding, key, query, value, and other attention parameters/weights of each attention mechanism employed by the large language model, prior to any output generation of raw code segments (e.g., the segments particularly requested in a last stage or ending portion of the code synthesis prompt) by the large language model. The internal representation of the input (i.e., code synthesis prompt) maintained by the large language model may be transformed in multiple ways, according to multiple different processes corresponding to different parameters or weights of the large language model, in parallel on coordinated computing threads of a multi-threaded computing resource, in certain embodiments where such specialized computing resources are used by the system that performs method 1400. Generally, the system that performs method 1400 may use any specialized computing resources that improve the computational efficiency and power consumption of operating large language models, such as graphics or tensor processing units, hardware-accelerated machine-learning processing units, field-programmable gate arrays, and high-speed memory enabled computing resources.

Process 1430 may conclude its processing of the code synthesis prompt by using output mechanisms of the large language model to synthesize the raw code segments. In some embodiments, the large language model may generate output by performing output processing on the internal representation of the code synthesis prompt, following the aforementioned transformation of an initial internal representation of the code synthesis prompt by the various processing and transformation mechanisms of the large language model (e.g., embedding, key, query, value, attention mechanisms). Internal data structures maintained on non-transitory storage by the large language model during processing of the code synthesis prompt may be transformed by output mechanisms of the large language model (e.g., value and output matrix transformations applied to processed internal representations or data structures associated with the code synthesis prompt), to produce the raw code segments requested in the ending portion of the code synthesis prompt. Raw code segments produced by output mechanisms of the large language model may be provided to a code segmenter, which produces segmented raw code segments (discussed in greater detail in connection with code segmenter 1512 of FIG. 15A).

After generating the raw code segments, method 1400 may proceed to process 1440, which functions to execute the plurality of raw code segments using a code interpreter for the target programming language. A prerequisite of the programming language used as the target language by the system performing method 1400 may be its interpreter having a programmatic interface, so that the operations of process 1440 may be performed automatically or programmatically. Additionally, the operations of process 1440 may require that hundreds or even thousands of raw code segments in the target programming language are provided to the code interpreter, which may preclude the operations of process 1440 from feasibly being performed for languages whose interpreter has no programmatic interface. The code interpreter may receive and execute each of the raw code segments derived from the large language model response to the code synthesis prompt, and return results or values based on the execution of the raw code segments.

Although the large language model used to generate the raw code segments is usually prompted (in the code synthesis prompt generated by process 1420, as an example) to produce functional and interpretable (i.e., valid) code in the programming language, this prompt may be insufficient to ensure the actual validity of raw code segments produced by the large language model. Results produced by the code interpreter may be indicative of its successful, or unsuccessful interpretation of the code. As one example, when the code interpreter provides execution results of a particular raw code segment that match the expected output value or execution results of said raw code segment, the system performing method 1400 may flag, tag, or otherwise designate the particular raw code segment as being valid. As another example, when the code interpreter is unable to provide execution results of a particular raw code segment, the system performing method 1400 may flag, tag, or otherwise designate the particular raw code segment as being invalid. Similar actions (to those just described in connection with invalid code that cannot be interpreted) may be taken by the system when the code interpreter successfully provides execution results of a particular raw code segment but said execution results do not match the expected output value or execution results of the particular raw code segment.

Method 1400 may proceed to process 1450, following execution of the plurality of raw code segments as described above in connection with process 1440. Process 1450 may function to determine one or more valid code segments from the plurality of raw code segments that were successfully executed by the code interpreter. The system performing process 1450 may receive execution results from a code interpreter and designate particular raw code segments as being valid or invalid, based on both whether execution results were received (indicative of successful code interpretation), and whether execution results matched the expected results associated with the particular raw code segments (indicative of appropriate code operation or performance). Determinations of code validity in the context of results from a code interpreter are described in greater detail below in connection with FIG. 15F. In some embodiments, raw code segments with invalid designations may be discarded, or retained for reparative processes that may be applied to the uninterpretable, inaccurate, or non-functional code so that it can be provided as a valid raw code segment (e.g., upon the repaired code being reprocessed by processes 1440 and 1450) for further utilization as a validated code synthesis training sample.

Method 1400 may proceed to process 1460, following determination of one or more valid code segments of the plurality of raw code segments as described above in connection with process 1440. Process 1460 may function to aggregate, via a second sampling (relative to the sampling of code synthesis items of process 1420) of the valid code segments determined in preceding step 1450, one or more validated code synthesis training samples. The validated code synthesis training samples may include a variable number of the raw code segments determined to be valid in the preceding step, aggregated with any necessary prior context (discussed in greater detail in connection with FIG. 15G and FIG. 15H which illustrate validated code synthesis training samples with different numbers of constituent code segments). Process 1460, when viewed as an element of an ordered combination of steps including preceding steps 1440 and 1450, may function to defend or insulate the basis of any code synthesis training samples used to train a code generation model from including the (contaminative) influence of any invalid synthetic code generated by the large language model in step 1430. Code generation models trained based solely on code that has been validated by an interpreter (such as the code generation model of the disclosed embodiments) may represent an improvement over conventional code generation models that are trained based on code that has not been validated by an interpreter, at least because the former models may have a higher probability of generating functional, accurate, and interpretable code than the latter models, which in turn makes the former models more computationally efficient in serving user requests for code in a target programming language. Further, by sampling packets of multiple validated raw code segments for use in training a code generation model instead of separating each example raw code segment, the code generation model can also encounter scenarios (in its training, which confers a performance advantage when encountered in deployment) where multiple uses of target programming language functions or procedures are present in the prior context, which prevents the generator from being destabilized when it encounters a novel scenario (in deployment), such as in scenarios where a user has already loaded a dataset and performed some operations.

Method 1400 may conclude with process 1470, which may function to train a code generation model using the one or more validated code synthesis training samples aggregated from validated raw code segments by the preceding process 1460. A code generation model may have an architecture for generating outputs on the basis of inputs capable of answering user questions or requests provided to the model either in natural language (e.g., a chatbot architecture), or in the form of code context from a development environment (e.g., a code completion architecture). Training of the code generation model by process 1470 may include operations such as instantiating an instance of the code generation model, and providing the code generation model to a model training framework that also receives the validated code synthesis training samples aggregated in preceding process 1460, which comprise the raw code segments that were determined to be valid by process 1450.

The model training framework may perform supervised learning operations based on the validated code synthesis training samples corresponding to the target programming language. The model training framework may further accept specification of hyperparameters that may influence the model architecture and may further influence the training and learning of the code generation models. Hyperparameters relating to training and learning conditions for the code generation model (e.g., training sample batch sizes, iterations, learning rate, sequence/token length, etc.) may either be received from a user, or be set algorithmically/programmatically by way of techniques such as a search method or operation (e.g., algorithmic or random search, or generally any heuristic optimization algorithm for optimizing model training/learning operations). Hyperparameters relating to output settings of the code generation model (e.g., parameters relating to confidence, risk, and randomness tolerances with respect to generated candidate responses to user requests), overfit correction considerations (e.g., model validation methods using out-of-sample training data, or randomized sampling of training samples) may be similarly specified (e.g., via user, or via optimization algorithm) without departing from the scope of the presently disclosed embodiments. In addition to guiding learning of the code generation model during the training process 1470 via hyperparameter tuning, the performance of the code generation model may be intermediately benchmarked during training, based on objective evaluations of its generated code (similar to the objective evaluations of synthetic raw code segments described in connection with processes 1440 and 1450). Model weights of the code generation model and hyperparameters may be modified based on the objective evaluations of code generated by the model during its training.

Training the code generation model by process 1470 may entail the iterative updating or transformation of weight or parameter matrices of the code generation model, by a model training framework employing one or more selected supervised learning methods, and the validated code synthesis training samples aggregated by process 1460. The training samples of process 1460 may be partitionable into distinct batches of training samples, each corresponding to a different feature, function, or task in the target programming language. With each iteration of training the code generation model, the configuration of the component data structures of the code generation models may be transformed or updated. As an example, an untrained code generation model may represent a first configuration of its component data structures and said data structures may be transformed or updated to a second configuration distinct from the first configuration after one training iteration. Similarly, with each of the plurality of iterations of training the code generation model on a batch of validated code synthesis training samples corresponding to a particular feature, function, or task of the target programming language, the code generation model may manifest different configurations or states. As an example, an untrained code generation model may represent a first configuration of its component data structures, said data structures may be transformed or updated to a second configuration distinct from the first configuration after a plurality of training iterations corresponding to a first feature of the target programming language, and said data structures may be transformed or update to a third configuration distinct from the first and second configurations after a plurality of training iterations corresponding to a second feature of the target programming language.

An example of configuration changes within the code generation model during, or in response to a training process (e.g., one or more supervised learning methods) may be the modification of internal representations of various input transformation mechanisms of the code generation model. As an example, the code generation model architecture may include multiple input processing mechanisms, including, but not limited to: input tokenization, token embedding, positional encoding, attention, feed-forward neural networks, projection into a higher-dimensional space, projection into a lower-dimensional space, normalization, convolutions, recurrence, feedback, decoding, and de-tokenization. Attention mechanisms used by the large language model may include self-attention, cross-attention, multi-headed attention, sparse attention, blockwise attention, linformer, reformer, ring, longformer, and adaptive attention span mechanisms. Each of the aforementioned mechanisms may comprise one or more data structures, such as weight matrices, that are updated anywhere from thousands to hundreds of thousands of times during a training process using validated code synthesis training samples. Each training iteration for the code generation model may correspond to a respective transformation or update to the data structures for each of the aforementioned mechanisms.

Training the code generation model may be considered to be completed upon indications or determinations indicating a sufficiently trained code generation model, such as: objective benchmark metrics indicating performance improvements of the code generation model have plateaued (e.g., overfitting indications, model output speed tradeoffs at higher training iterations, etc.), computational complexity considerations (e.g., motivations to conserve compute resources expended on training and operation of the code generation model), and predetermined training iteration thresholds. Generally, the determination of when the code generation model training is done by the system performing method 1400 based on some predetermined training completion or training success criteria, rather than by manual/human intervention based on visual determination. Training samples for the code generation model described are based on validated synthetic raw code segments synthesized by the large language model (by process 1430), and aggregated (by process 1460). Additional validated synthetic raw code segments generated by process 1430 that were not used as training samples for the code generation model may be used for validation operations of code generation model, which may be used to determine when training of the code generation model is completed. As an example, a first portion of a synthetic raw code segment not included in the aggregated validated code synthesis training samples (of process 1460) corresponding to a simulated user request for operational code in a target programming language may be provided to the code generation model, periodically during its training. Code generation model output produced in response to being provided such an out-of-training sample as input may be used as an indicator of the code generation model maturity. As an example, model output may be validated for interpretability, operationality, and accuracy of responses to out-of-training sample inputs. Training may be considered complete upon the code generation model achieving more than a threshold number of out-of-training sample validations during its training process, or when the model achieves more than a threshold percentage of out-of-training sample validations. In some embodiments, training the code generation model may involve maximization of some objective function (e.g., out-of-training sample validations of model output). In other embodiments, training may be considered complete based on minimization of some other objective function (e.g., erroneous or uninterpretable model outputs). In yet other embodiments, training may be considered based on a predetermined number of training iterations through the entirety or a sampling of the validated code synthesization training samples aggregated by process 1460 (e.g., one, one thousand, one million training iterations, etc.).

A system performing method 1400 may require use of application-specific computing resources at multiple component processes of the method, due to the limitations of general-purpose computing equipment in performing the operations entailed by the component processes. As an example, in process 1470 relating to training the code generation model, a system performing method 1400 may require, or employ in a preferred embodiment: graphics or tensor processing units, hardware-accelerated machine-learning processing units, field-programmable gate arrays, multi-core or multi-threaded processors, parallelized computing or network resources, and high-speed memory enabled computing resources. Operations of method 1400 may be performed on a single computing device, a cluster of multiple networked computing devices, or any other suitable distributed computing methods.

Figure 15A:
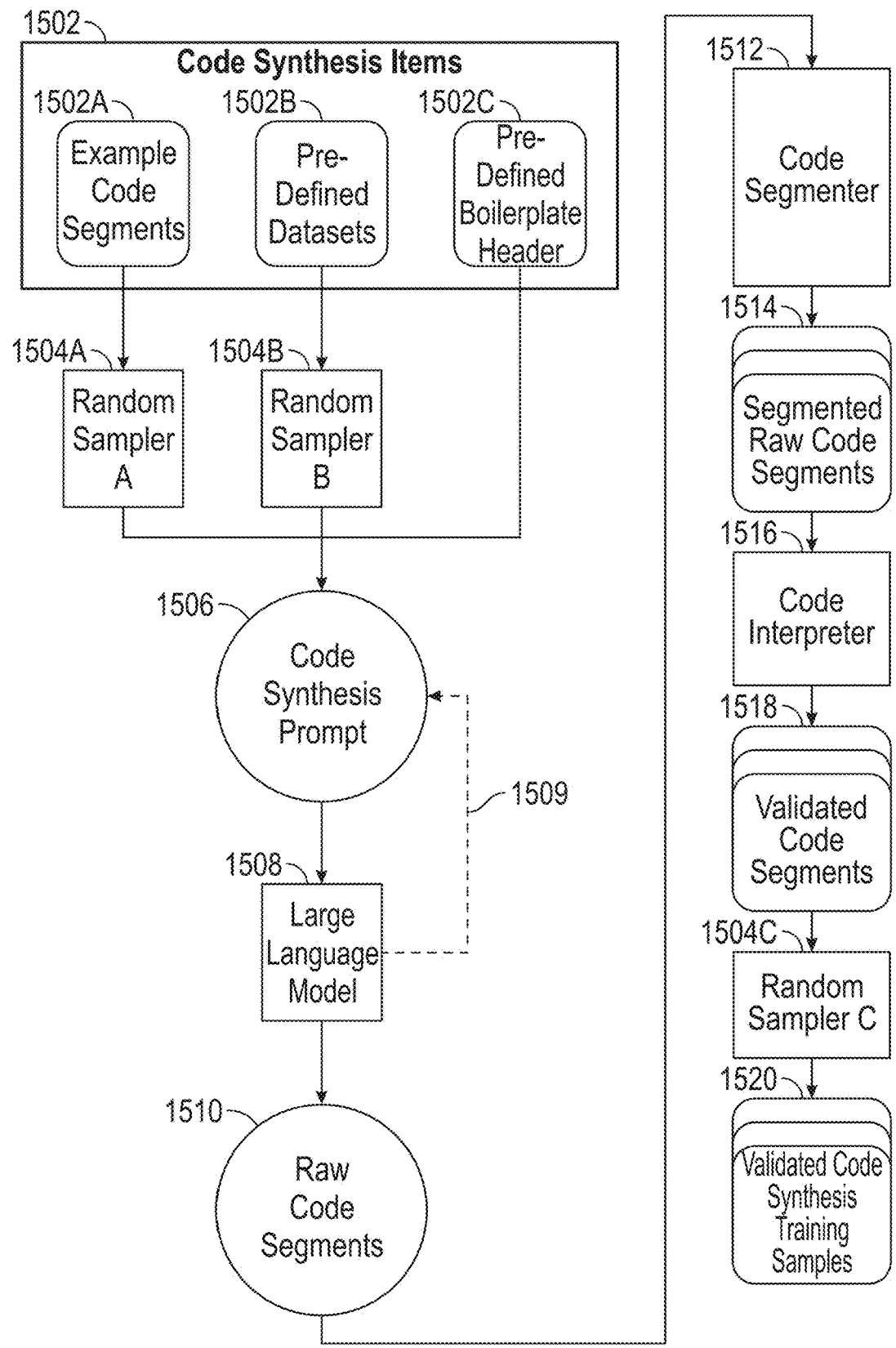
FIG. 15A illustrates an exemplary system architecture of components used for synthesizing, validating, and aggregating code segments using a large language model, according to some embodiments of the present technology.

FIG. 15A illustrates an exemplary system architecture of components used for synthesizing, validating, and aggregating code segments using a large language model, according to some embodiments of the present technology. FIG. 15A may also illustrate a data path corresponding to processes 1410-1460 of method 1400 of FIG. 14, culminating in the aggregation of validated code synthesis training samples used for training a code generation model in process 1470. The computing resources and data assets illustrated in connection with FIG. 15A may represent at least a portion of the system that performs method 1400. Code synthesis items 1502 may include example code segments 1502A, predefined datasets 1502B, and predefined boilerplate headers 1502C. Process 1410 of method 1400 relates to the identification of these items, which may involve accessing said items from a local code storage resource, public code storage resources (i.e., the internet), or a combination of local and public code storage resources. In some embodiments, code synthesis items 1502 may include manually-input code provided by an expert in the target programming language. In some other embodiments, one or more code synthesis items 1502 may be derived from publicly or privately available documentation, discussion, and/or examples relating to the target programming language (e.g., private, public, or Internet-based machine-readable help resources for users of the target programming language). As mentioned earlier, the target programming languages may include, without being limited to, any of the following: SAS, Ada, or COBOL, Fortran, ABAP, RPG, LabVIEW, VHDL, MATLAB, LITI, Julia, Golang, Haskell, Erlang, Scala, LaTeX, Maple, Magma, Maxima, or scarcely-documented Python libraries such as NumPy, SciPy, or SymPy. Generally, the target programming language may include any low-resource or scarcely-documented programming, machine-readable, or machine-interpretable language, and can include libraries of abundantly documented programming languages when said libraries have scarce publicly-available documentation.

Turning briefly to FIG. 15B, exemplary code segments containing user-assistant prompts for code in a target programming language and corresponding code completions may be illustrated, corresponding to example code segments 1502A of FIG. 15A. A first pair 1522 of a user prompt 1522A and an assistant completion 1522B may include a prompt for functional code in a target programming language known as SAS, for purposes of illustration. User prompt 1522A may be interpreted as a natural language (i.e., conversational English) request for SAS code that prints a reference dataset provided in a help library. Assistant completion 1522B may be an expert-provided or documentation-provided example of an accurate, interpretable, and operational SAS code segment that is responsive to the request of user prompt 1522A. Similarly, a second pair 1524 of user prompt 1524A and assistant completion 1524B may respectively include a request for SAS code that prints a range (namely, the "first five") observations from a particular data structure, and a code segment responsive to the user's request. Finally, a third pair 1526 of user prompt 1526A and assistant completion 1526B may respectively include a request for SAS code that conditionally prints observations from a particular data structure (namely, observations where blood pressure exceeds 110), and a code segment responsive to the user's request. Notably, each pair 1522, 1524, and 1526 may include particular formatting preceding various requests (user prompts) for code (namely, "prompt:"), and particular formatting preceding various responses (assistant completions) to requests for code (namely, "completion:").

Although FIG. 15B illustrates particular pairs of user prompts and assistant completions, in connection with a particular functional or operational aspect of the target programming language (e.g., formatted pairs of user prompts and assistant completions relating to the print function), in a particular target programming language (e.g., SAS), it shall be understood that example code segments 1502A are not limited to these particulars in embodiments of the presently disclosed embodiments. In some embodiments, pairs of user prompts and assistant completions may relate to statements in a target programming language that call and execute a procedure, sometimes with a data set as input. Examples of such statements may include data analysis functions, formatted reports or results generation functions, file management functions, display functions, and statistical functions. In some embodiments specific to SAS as the target programming language, additional functional or operational aspects of the target programming language connected to pairs formatted pairs of user prompts and assistant completions in example code segments 1502A may include: DATA steps to create, import, and/or manipulate data, and PROC steps to analyze and process data, produce output, or manage SAS files.

In some embodiments, example code segments 1502A may include formatted pairs of user prompts and assistant completions connected to any functional or operational aspect of any target programming language. Examples of functions or operations of a target programming language that are represented in example code segments 1502A may include: arithmetic, trigonometric, statistical, analytic, and rounding (e.g., mathematical) functions; data type, database, and data structure manipulations, data mining or scraping, visualization, logical, classifying, forecasting, modeling, machine learning, and user-defined functions or operations; domain-specific, hardware-interfacing, cloud analytic services-interfacing, protocol-compliance, and file or object management functions.

Turning briefly to FIG. 15C, exemplary predefined datasets containing an external dataset reference and an inline dataset definition may be illustrated, corresponding to example predefined datasets 1502B of FIG. 15A. Predefined datasets may specifically include comments formatted in the target programming (e.g., explanatory text beginning with "/*" and ending with "*/," for SAS code) that explain the function of the code, as well as a description or specification of the contents (e.g., labels of column variables, rows of values, etc.) of the dataset. In some embodiments, dataset examples of predefined datasets 1502B may include portions of code derived or directly-copied from documentation, discussion, or examples of code in the target programming language from any number of private or public sources. In some embodiments, dataset examples may be manually-input by an expert user specifically for use as a basis for synthetic code generation activities (e.g., operations of the downstream components and their transformative processes applied to code synthesis items 1502).

A first dataset example 1528 may include comments explaining the function of the code they precede, and further explaining the dataset that is loaded by the code. Example 1528 may illustrate an external dataset reference of a particular dataset, in the target programming language SAS. First dataset example 1528 may relate to a programmatic reference to a pre-formatted dataset associated with help resources in SAS named "sashelp.bei," whose contents (relating to tropical rain forest tree data) are unspecified in the comments of the dataset example, being loaded into cloud analytic services that are accessible and addressable in the SAS programming language. Second dataset example 1530 may specifically include comments formatted in the target programming language that generally explain the contents of the dataset it precedes. Second dataset example 1530 may differ from first dataset example 1528 in that the second dataset example contains no programmatic reference to a pre-formatted dataset, but instead contains an in-line (e.g., explicit) specification of the dataset in a rows of data values in a character-separated format (e.g., space or blank character), according to SAS programming language conventions and syntax. First dataset example 1528 and second dataset example 1530 may illustrate two different predefined dataset incorporation or specification conventions (e.g., incorporation by programmatic reference, and in-line specification), predefined datasets 1502B may contain any number of dataset incorporation or specification conventions that are supported by the target programming language, including duplicate predefined dataset examples for a particular dataset incorporation or specification convention in the language. In some embodiments, predefined datasets 1502B may contain at least one example for each particular dataset incorporation or specification convention supported by the target programming language. In some embodiments, predefined datasets 1502B may contain at least one example for each particular dataset schema or formatting standard supported by the target programming language.

FIG. 15D illustrates exemplary predefined boilerplate headers for accessing network services and referencing libraries, according to some embodiments of the present technology. Boilerplate headers may help instantiate, import, or incorporate by reference computing resources or programming libraries that enable the implementation and interpretation of the code they precede. In the example of predefined boilerplate headers 1502C illustrated by FIG. 15D, a connection to cloud analytic services (CAS) may be established. The connection established by the example may point to a standard CAS server at a particular domain and a particular port, that an interpreter for the SAS programming language uses for testing. Moreover, the example of FIG. 15D may establish a label or alias (known as "libref" in SAS) that is assigned to the connection or session established with the CAS server for reference by later code. In general, each example in predefined boilerplate headers 1502C may serve as a prerequisite and enabling operation for respective computing operations in the target programming language that require specific resources or libraries. In some embodiments, predefined boilerplate headers 1502C may include examples of predefined boilerplate headers that instantiate, import, or incorporate by reference every valid combination of computing resources or programming libraries that may be required by a user to perform specific functions or execute specific operations in the target programming language. In such embodiments, predefined boilerplate headers 1502C may include one example of a header with all prerequisite and enabling operations required for each of the specific functions or operations supported by the target programming language.

Returning to FIG. 15A, it may be appreciated that code synthesis items 1502 and example code segments 1502A (example illustrated in FIG. 15B), predefined datasets 1502B (example illustrated in FIG. 15C), and predefined boilerplate headers 1502C (example illustrated in FIG. 15D) correspond to the items identified by process 1410 of method 1400 of FIG. 14. To execute the operations of process 1420 of method 1400, the system illustrated by FIG. 15A may utilize random sampler A 1504A and random sampler B 1504B. In some embodiments, an agentic process, sub-routine, or orchestration mechanism may be implemented on the system performing method 1400 to compose a code synthesis prompt 1506 using the randomly sampled code synthesis context from random samplers A and B. In particular, random samplers A and B may be used by the system to provide code synthesis context from code synthesis items 1502 to code synthesis prompt 1506 by shortening or abridging a vast number of examples and segments of code represented by code synthesis items 1502. As an example, the simple concatenation of all the examples and segments of code represented by code synthesis items 1502 may exceed a limited context window size of a large language model 1508, making such a simple concatenation unsuitable as a basis for code synthesis context in code synthesis prompt 1506.

Instead, a first random number (e.g., a sampling from a random distribution, or result of a random number generator) of example code segments may be selected from example code segments 1502A by random sampler A 1504A to be used as code synthesis context. Similarly, a second random number of examples may be selected from predefined datasets 1502B by random sampler B 1504B to be used as code synthesis context. In some embodiments (not illustrated in FIG. 15A), a third random sampler may be used to select a third random number of examples from predefined boilerplate headers 1502C. However, in some other embodiments, selection of elements from predefined boilerplate headers 1502C may be forced by the random selections (performed by samplers 1504A and 1504B) of example code segments 1502A and predefined datasets 1502B chosen for incorporation into code synthesis prompt 1506. As an example, if a particular predefined dataset example is selected by random sampler B 1504B from predefined datasets 1502B, then a particular corresponding header from predefined boilerplate headers 1502C may be concatenated to the particular predefined dataset in that order, prior to the inclusion of the dataset example in code synthesis prompt 1506. In such an example, the particular corresponding header may be selected for its instantiating, importing, or incorporating by reference every valid combination of computing resources or programming libraries that may be required by the code corresponding to the particular predefined dataset. As another example, if a particular code segment example is selected by random sampler A 1504A from example code segments 1502A, then a particular header from predefined boilerplate headers 1502C may be concatenated to the particular example code segment, prior to the inclusion of the code segment example in code synthesis prompt 1506. Similarly, combinations of example code segments and predefined datasets may necessitate the selection of a particular header from predefined boilerplate headers that enable the performance of each particular combination.

In some embodiments, the random number of example code segments selected by random sampler A 1504A and random sampler B may be bounded between 1 and a number of examples permitted by the size of a "context window" or message bandwidth of large language model 1508, such that the inclusion of the number of randomly sampled example code segments and predefined datasets, along with their respective predefined boilerplate headers, into code synthesis prompt 1506 does not cause the prompt to exceed the context window size. The upper bound on the number of example code segments selected by random samplers based on the size of a context window may be determined based on repeatedly sampling additional example code segments and example predefined datasets, along with their associated predefined boilerplate headers, starting with an empty set of examples (and proceeding to include the first sample, second sample, etc.). When the addition of a n-th sample, where n is any number greater than 1, to the set of examples causes the size of the set of examples to exceed the size of the context window of the large language model, the n-th sample may be excluded or omitted from the set of examples, and sampling operations of random sampler A and random sampler B may conclude. In some embodiments, randomly sampled example code segments may make up a majority of the context window in the code synthesis prompt, with the number of randomly sampled example predefined datasets and their respective boilerplate headers being set at some predetermined value (e.g., one, two, or three randomly sampled predefined dataset examples). The sampling by random sampler A (of example code segments) and by random sampler B (of predefined datasets) along with the concatenation of relevant predefined boilerplate headers may sometimes be referred to as a "first sampling" of code synthesis items (e.g., in the context of process 1420).

FIG. 15E illustrates component messages and code examples of an exemplary code synthesis prompt, according to some embodiments of the present technology. As alluded to earlier in connection with descriptions of process 1420, the code synthesis prompt may be based on the sampling of code synthesis items. In addition to the sampling of code synthesis items, the code synthesis prompt may include a system message composed of multiple formatted subprompts. In some embodiments, such as the illustrative and exemplary embodiment of FIG. 15E, a system message 1506A may include natural language (i.e., conversational English) statements addressed to a large language model as a system (i.e., instructions to the system that are separate, but relevant to the request for synthetically generated code segments of the code synthesis prompt). Sub-prompts 1506A1, 1506A2, and 1506A3 may each provide different contextual prompts indicative of user expectations that cause large language model 1508 to produce output in accordance with said contextual prompts. Sub-prompt 1506A1 may be referred to as an identity prompt and may communicate a particular user expectation to large language model 1508 about its assumed identity when generating (e.g., expectations about the identity of the response originator being helpful, explanatory, and realistic). Sub-prompt 1506A1 may include a heading portion preceded by the "#" symbol, and a prompt portion indicating expected attributes of the identity of the large language model when generating responses and expected attributes of the code generated by the large language model. Artisans of ordinary skill may appreciate that although sub-prompt 1506A1 is specific to SAS as the target programming language, any suitable identity prompt relevant to a large language model tasked with generating code in any target programming language may be provided as a sub-prompt in code synthesis prompt 1506.

Sub-prompt 1506A2 may be referred to as a code convention prompt and may communicate a particular user expectation to large language model 1508 about its code conventions and/or design patterns. In particular, subprompt 1506A2 may communicate specific user expectations about variable references in generated code being preceded by a definition or instantiation of said variable. Sub-prompt 1506A2 may additionally communicate specific user expectations about generated code attributes (e.g., self-contained code) and presentation attributes of generated code (e.g., presented in one unbroken code block). Sub-prompt 1506A2 may include a heading portion preceded by the characters "##," and a prompt portion indicating expected code conventions and/or design patterns expected of the code generated by the large language model. Artisans of ordinary skill may appreciate that although sub-prompt 1506A2 specifies a particular set of code and presentation attributes, any suitable code convention, code presentation, or design attributes may be provided as a sub-prompt in code synthesis prompt 1506. Sub-prompt 1506A3 may be referred to as a target language prompt and may optionally communicate expectations to the large language model that are complementary to those communicated by identity sub-prompt 1506A1. In particular, sub-prompt 1506A3 may communicate specific user expectations about the target programming language (e.g., SAS or any other target programming language) in which code will be generated by the large language model. Similar to sub-prompt 1506A2, sub-prompt 1506A3 may include a heading portion preceded by the characters "##," and a prompt portion indicating the specific target programming language expected from the large language model by the user. Artisans of ordinary skill may appreciate that although sub-prompt 1506A3 is specific to SAS as the target programming language, any suitable target language prompt relevant to a large language model may be provided as a sub-prompt in code synthesis prompt 1506.

In addition to including system-level statements of user expectations via system message 1506A that are addressed to the large language model, code synthesis prompt 1506 may include a composition of code synthesis items 1502 in a format suitable for processing by the large language model (LLM). In some embodiments, an example of an LLM-formatted composition of code synthesis items may be simulations of user-interactions with a code-completion or user-assistant tool. Simulations of user-interactions with the tool may have a similar example to the formatting described above in connection with the formatting used by examples 1502A1, 1502A2, and 1502A3 of example code segments 1502A illustrated in FIG. 15B. Namely, simulations of user-interactions with the tool may be formatted as pairs of user prompts and assistant completions corresponding to expected output of the large language model acting under the identity (e.g., a code generation tool for the target programming language) specified by system message 1506A.

FIG. 15E goes on to illustrate an exemplary simulated user-assistant code completion pair A 1506B that may follow system message 1506A in some embodiments. Simulated user-assistant code completion pair A 1506B may begin with a formatted user prompt 1506B1 that begins with "==========user===============," and includes a simulated user request or prompt to a code generation tool in the target programming language. In the example of FIG. 15E, the target programming language may be SAS, but ordinarily skilled artisans may appreciate that the general format of simulated user-assistant code completion pair A 1506B may be applicable to a code synthesis prompt for any target programming language without departing from the scope of the presented embodiments. With specific regards to simulated user-assistant code completion pair A 1506B, the simulated user prompt 1506B1 for code generation may specifically request eight examples of "PROC SORT," which is a function in the SAS language. In some embodiments, the agentic process, sub-routine, or orchestration mechanism implemented on the system to perform method 1400 to compose a code synthesis prompt 1506 using the randomly sampled code synthesis context may generate the simulated user prompt 1506B1 based on example code segments 1502A randomly sampled by random sampler A 1504A from code synthesis items 1502.

Simulated user-assistant code completion pair A 1506B may proceed from simulated user prompt 1506B1 to a simulated assistant completion 1506B2 that begins with "==========assistant==============," and includes a simulated response to the simulated user request containing the number of code examples requested in the simulated user prompt. In particular, the simulated response may include eight examples, 1506B2-1, 5006B2-2, 1506B2-3, 1506B2-4, 5006B2-5, 1506B2-6, 1506B2-7, and 1506B2-8, that are relevant responses (e.g., functional examples of "PROC SORT") to the simulated user prompt, and that may be adapted from example code segments 1502A that were randomly sampled by random sampler A 1504A. Each of the examples in simulated assistant completion 1506B2 may include an explanatory comment delimited by the "/*" and "*/" sequences of characters that indicate commented text that is skipped during code compilation activities. Each of the examples may also include code in the target programming language that corresponds to the explanation provided in the comment. Each of the examples may be selected such that various use cases or variations of the function or functionality requested in the user prompt 1506B1 are represented in the simulated assistant completion 1506B2.

First example 1506B2-1 may sort the data set account by the values of three variables, in which the variable "debt" is sorted in descending order and may create an output data set "sorted" that contains the sorted observations. As another example, 1506B2-2 may sort the data set by using linguistic collation and the ALTERNATE_HANDLING=SHIFTED option, and may order the observations by the values of the variable "x." As another example, 1506B2-3 may sort the observations of the data set "sashelp.baseball" by all the variables, and keep only the variables "division" and "league," and eliminate all duplicate observations to create the output data set "DL."

Example 1506B2-4 may sort the dataset "account" by the values of "town" and "company" and create the output dataset "bytown." Examples 1506B2-5 may sort the dataset "insurance" by the values of "yearsworked" without maintaining the relative order (using the NOEQUALS option) and create the output dataset "byyears2." Example 1506B2-6 may use linguistic sorting (ALTERNATE_HANDLING=SHIFTED and STRENGTH=4) to treat "a-b" and "ab" as equivalent for sorting operations. Example 1506B2-7 may sort the data set account by town and keep only the first observation of each group to create the output data set "towns." Example 1506B2-8 may sort the data set insurance by "yearsworked" and maintain the relative order with the EQUALS option to create the output data set "byyears1." Ordinarily skilled artisans can readily appreciate that although examples 1506B2-1 through 1506B2-8 may be specific to examples that highlight various nuances and functionalities specific to the PROC SORT function of SAS, simulated assistant completion 1506B2 may include different examples relevant to other specific nuances of functionalities of functions in other target programming languages, without departing from the scope of the presently disclosed embodiments.

FIG. 15E further illustrates an exemplary simulated user-assistant code completion pair B 1506C that may follow system message 1506A and simulated user-assistant code completion pair A 1506B in some embodiments. Simulated user-assistant code completion pair B 1506C may be formatted similarly to simulated user-assistant code completion pair A 1506B, with a different simulated user prompt 1506C1 and a different simulated assistant completion 1506C2 (relative to user prompt 1506B1 and assistant completion 1506B2). In particular, simulated user prompt 1506C1 may specifically request three examples of "PROC PRINT," which is a function in the SAS language. Simulated assistant completion 1506C2 may include three examples 1506C2-1, 1506C2-2, and 1506C2-3, that are relevant responses (e.g., functional examples of "PROC PRINT") to the simulated user prompt. As with the examples in the simulated assistant completion of the previous simulated user-assistant code completion pair, each of the examples in simulated assistant completion 1506C2 may include an explanatory comment with delimiting character sequences, code in the target programming language corresponding to the explanation in the explanatory comment, and may be selected such that various uses cases or variations of the function or functionality requested in the user prompt 1506C1 are represented in the simulated assistant completion 1506C2. As with completion pair A 1506B, the user prompts and assistant completions of the simulated assistant completion 1506C2 may be derived from code synthesis items 1502, namely its constituent functional code that is exemplary for the functionalities and nuances of the target programming language included in code synthesis prompt 1506. Code synthesis prompt 1506 as illustrated by FIG. 15E may be specific to SAS, but ordinarily skilled artisans can readily appreciate that the processes involved in generating code synthesis prompt 1506 may be readily applicable and replicable in any scarcely-documented or low-resource target programming language. Code synthesis prompt 1506 may generally be composed of examples from user code bases, target programming language documentation (e.g., digital documentation for the target programming language), user discussions (e.g., support forum content or correspondences), and the internet. In some embodiments, code synthesis prompt 1506 may be include examples based on manually composed functional code in the target programming language curated by a human operator of the system performing method 1400, to optimize the direct relevance of examples provided as context to the code synthesis items 1502 to particular applications and contexts that the code assistant trained based on synthetic code produced by code synthesis prompt 1506 may be tasked with providing completions for, in response to user prompts.

Simulated user-assistant code completion pair A 1506B and simulated user-assistant code completion pair B 1506C may function as context within code synthesis prompt 1506, preceding an actual request (for particular functional code in the target programming language) to LLM 1508 in code synthesis prompt 1506. In other words, simulated user-assistant code completion pairs 1506B and 1506C may be provided to LLM 1508 as formatted example interactions between a user and a code assistant, that along with system message 1506A, may influence the generation of a response to a request for functional code by LLM 1508. In particular, ingestion of system message 1506A and simulated user-assistant code completion pairs 1506B and 1506C may cause an internal representation of the target programming language code generation prompt (including the request for particular functional code that follows pairs 1506B and 1506C) by LLM 1508 to be configured such that LLM outputs are generated on the basis of response-relevant patterns, syntactic conventions, and meanings embedded within and represented by said ingested messages and simulated user-assistant code completion pairs.

In some embodiments, simulated user-assistant code completion pairs may be considered messages to LLM 1508 (akin to the system message), and code synthesis prompt 1506 may be considered a multi-message prompt that culminates in a prompt message to LLM 1508. Following the aforementioned context, of a system message 1506A and a number of simulated user-assistant code completion pairs relating to different respective functions 1506B and 1506C, code synthesis prompt may include a prompt for generating synthetic raw code segments. When assembling a code synthesis prompt, a system performing process 1420 of method 1400 may include a particular number of context messages (system messages, simulated user-assistant code completion pairs) that correspond to an available context window size of LLM 1508. As discussed above in connection with the functioning and sampling operations performed by random sampler A and random sampler B of FIG. 15A, an available context window size may be a parameter that varies according to the specific implementation of LLM 1508 used for generation of synthetic raw code segments. Code synthesis items 1502 that are randomly sampled or selected for inclusion in code synthesis prompt may be transformed by an agentic or otherwise autonomous language transformer component of the system performing method 1400, to conform said code synthesis items to formatting conventions discussed in connection with simulated user-assistant code completion pairs, and their component simulated user prompts and simulated assistant completions.

The context window size-based upper bound on the number of example code segments selected by random samplers of FIG. 15A to be included in code synthesis prompt 1506 as contextual simulated user-assistant code completion pairs may be based on repeatedly sampling additional example code segments and example predefined datasets, and including associated predefined boilerplate headers for each of those sampled or selected code synthesis items. A set containing the samplings of code synthesis items 1502 may begin as an empty set of examples, and after the operations of random samplers A and B, may include the first sample, second sample, etc. When the addition of a n-th sample, where n is any number greater than 1, to the set of sampled code synthesis items causes the size of a corresponding set of examples (e.g., the transformed code synthesis items conforming to formatting conventions for user prompts and assistant completions) to exceed the size of the context window of LLM 1508, the n-th sample may be excluded or omitted from the set of sampled code synthesis items, as well as the set of examples of simulated user-assistant code completion pairs. The upper bound on the number of examples provided in code synthesis prompt 1506 may, in some embodiments, be based on a bounding value corresponding to size of the prompt for synthetic raw code segment generation subtracted from the context window size of LLM 1508.

Code synthesis prompt 1506 may conclude with a synthetic training code generation prompt 1506D (sometimes referred to as a "generation prompt") that includes a particular request that prompts LLM 1508 to generate a plurality of raw code segments (sometimes referred to as "synthetic raw code segments"). Synthetic training code generation prompt 1506D may be considered to take the entire foregoing portion of the code synthesis prompt (i.e., the system-level statements of system message 1506A, and formatted simulations of user-interactions 1506B and 1506C) as "context," or information that indirectly influences the output, for the large language model. The particular request for generating a plurality of raw code segments in prompt 1506D may specify a particular number of raw code segments that the large language model should generate (i.e., one, two, three segments, etc.), as well as the nature of the raw code segments (i.e., segments that incorporate a first, second, third feature, etc.). In some embodiments, the particular request for generating a plurality of raw code segments may be formatted similarly to a user prompt from a simulated user-assistant code completion pair, without a corresponding assistant completion.

As illustrated in FIG. 15E, prompt 1506D may request LLM 1508 to generate ten diverse examples of proc print focusing on examples using the sashelp/iris dataset, and may contain a formatted user prompt 1506D1 that begins with "===========User==============," similar to the user prompts of simulated user-assistant code completion pairs A and B of code synthesis prompt 1506. Following the formatted user prompt 1506D1, synthetic training code generation prompt 1506D may include prior context 1506D2 that includes specific context (optionally derived from code synthesis items 1502, or predefined boilerplate headers 1502C) relating to or supporting the request contained in user prompt 1506D1. In particular, prior context 1506D2 may relate to establishing a connection to cloud analytic services (CAS). The connection established by the code of prior context sub-message 1506D2-1 may point to a standard CAS server at a particular domain and a particular port, that an interpreter for the SAS programming language uses for testing. Further, the code of prior context sub-message 1506D2-1 may establish a label or alias (known as "libref" in SAS) that is assigned to the connection or session established with the CAS server for reference by code generated by LLM 1508. Finally, prior context 1506D2 may include sub-message 1506D2-2 that contains code to load an example dataset referred to as sashelp.IRIS into the connection session established with the CAS server. Sub-messages 1506D2-1 and 1506D2-2 may include comments in SAS or the target programming language that explain the function of the code they contain.

Returning to FIG. 15A, code synthesis prompt 1506 of FIG. 15E may be generated by the system performing method 1400 (namely, the portion of the system that performs process 1420). In some embodiments the system performing process 1420 may be an autonomous or agentic computing routine that is configured to operate on code synthesis items 1502 without human intervention or control. In such embodiments, the system performing process 1420 by which code synthesis prompt 1506 is generated may be provided foreknowledge of the application or deployment context that a trained model using the synthesized code would be used for. In some embodiments, the system performing process 1420 may provide for graphical affordances to be displayed to a user, capable of receiving configuration parameters for said deployment contexts (e.g., specific examples of target programming language functionality that should be prioritized in the limited context window length of LLM 1508). As an example, a user may be provided a graphical affordance to provide a location for a code base, or to provide attributes of a target code base, corresponding to the context in which user prompts may originate. Accordingly, the system performing process 1420 may prioritize specific functions and functionalities of the target programming language represented in the target code base, when composing the simulated user-assistant code completion pairs provided as context preceding the synthetic code generation prompt.

Returning to FIG. 14, following the generation of code synthesis prompt 1506 by process 1420, method 1400 may proceed to process 1430 by which LLM 1508 synthesizes a plurality of raw code segments 1510. Output mechanisms of LLM 1508 may cause raw code segments 1510 to be provided to the system performing method 1400 as an unbroken block of formatted code in the target programming language corresponding to all of the requested functions and functionalities of the user prompts for synthetic code generation in code synthesis prompt 1506.

In some embodiments, code synthesis prompt 1506 may request 10 or more completions (or alternate responses) corresponding to functional code in the target programming language, by the synthetic code generation prompt of code synthesis prompt 1506. Additionally, code synthesis prompt 1506 may request 10 or more such requests corresponding to different various functions or functionalities in the target programming language. In some embodiments, the system performing method 1400 may require a minimum number of functional code responses to a user prompt in the target programming language, and another minimum number of user prompts for functional code corresponding to different various functions. As an example, with both minimum numbers assumed to be ten, the system performing method 1400 may require one hundred (ten multiplied by ten) one hundred code completions or responses to ten user prompts may be generated by LLM 1508. In such an embodiment, LLM 1508 may in practice generate more than one hundred code completions or responses to ten user prompts, due to also experiencing a non-ideal yield for functional code from its synthetic code generation activities.

Parameters for number of requested functionalities through different user prompts, and the number of functional code responses yielded by each request may determine an example set size corresponding to a corpus of training data used to train and deploy a code assistant or code completion model (sometimes referred to as simply a "code generation model") to service user requests for code in any target programming language. In some embodiments, the size of said corpus of training data, and number of unique functionalities (sometimes referred to as a number of "novel arrangements" or "situations" documented in a target programming language) represented within said corpus of training data may be tunable hyperparameters of the code assistant or completion model that may be adjustable or configurable by a user based on the intended or selected architecture of the code assistant or code completion model, prior to its training and deployment. In some embodiments, a user may configure a size of the corpus of training data used to train a model or configure a number of unique functionalities or novel situations that a code completion model is trained on. In some embodiments, multiple different pre-trained models may be available to a user, corresponding to models trained on respective corpuses of training data with different respective sizes and component novel situations in a target programming language. In some embodiments, an amount of available computing resources or user-defined ceilings on model sizes may also influence the size of said corpus of training data.

To aid in the verification of the functionality (sometimes referred to as "validation") of raw code segments 1510, the system may provide the raw code segments 1510 to code segmenter 1512. Segmenter 1512 may enable the system performing process 1440 of method 1400 to test each raw code segment example produced by LLM 1508 separately by generating segmented raw code segments 1514. As the target programming language may usually be selected after already determining said language having an interpreter with a programmatic interface (termed a "prerequisite of the programming language used as the target language" in the FIG. 14 disclosure above), the segmentation of code segmenter 1512 may enable operations of process 1440 may be performed automatically or programmatically. Without code segmenter 1512, raw code segments 1510 could only be automatically or programmatically interpreted as they were output by LLM 1508 (e.g., as a single unbroken block of synthetic code in the target programming language corresponding to the user prompts in code synthesis prompt 1506). However, the output format of LLM 1508 may not lend itself to individual evaluation of the functionalities of the various individual component segments of raw code, which may be valid independent of one another at a granularity that cannot be appreciated or detected by interpreting the raw code segments as an unbroken block (i.e., interpreting the unbroken block format that LLM 1508 produces does not allow for the independent validation of each of the component code segments in the block).

In some embodiments, between processes 1430 and 1440, the system performing method 1400 may perform code segmentation operations. Code segmentation may be performed by a natural language processing (NLP) algorithm or process configured to receive an unbroken block of code produced by LLM 1508. In some embodiments, code segmentation may be performed by an LLM, different from LLM 1508, that is specifically configured to convert an unbroken block of code (raw code segments 1510) into a plurality of segmented raw code segments 1514.

Code segmentation operations may involve tokenization of the raw code segments 1510, syntax analysis that parses the code to analyze the syntactic structure of the code, semantic analysis that analyzes the meaning of the code segments, function identification, dependency analysis, segmentation, and optional segmentation refinement by which a user of the system performing method 1400 may adjust or correct results of the segmentation process. In some embodiments, syntax analysis operations performed during code segmentation may include parsing the code to identify elements such as functions, classes, loops, and conditional statements in the target programming language, and may involve using tools like abstract syntax tree (AST) analysis and dependency graphs. In some embodiments, semantic analysis operations performed during code segmentation may include considerations of relationships between variables, functions, and data structures in the target programming language. In some embodiments, function identification may include locating function declarations and their corresponding bodies, as well as analyzing function calls to determine their relationships and dependencies. In some embodiments, dependency analysis may include determining how different code segments depend on one another with respect to features in the target programming language such as function calls, variable references, or shared/referenced data structures. In some embodiments, segmentation operations may include consideration of context from syntax analysis, semantic analysis, function identification, and dependency analysis to group related code segments into functional groups of code segments in the target programming language. In some embodiments, a visual affordance may be provided to a user of the system performing method 1400 for verifying and optionally adjusting and correcting the identified segments produced by the segmentation process.

Following the segmentation and individualization of each of the component of raw code segments 1510 into segmented raw code segments 1514, the system performing method 1400 may proceed to process 1440 by providing said segments 1514 to code interpreter 1516 (shown in FIG. 15A). The code interpreter may receive and execute each of the raw code segments derived from the large language model response to the code synthesis prompt, and return results, values, or comments based on the execution results of the raw code segments. Although the large language model used to generate the raw code segments is usually prompted (in the code synthesis prompt generated by process 1420 and used as the basis for the synthesizing process 1430, as an example) to produce functional and interpretable (i.e., valid) code in the programming language, this prompt may be insufficient to ensure the actual validity of raw code segments produced by the large language model. Process 1440 may ensure the actual validity of segmented raw code segments 1514 by providing them to code interpreter 1516.

Figure 15F:
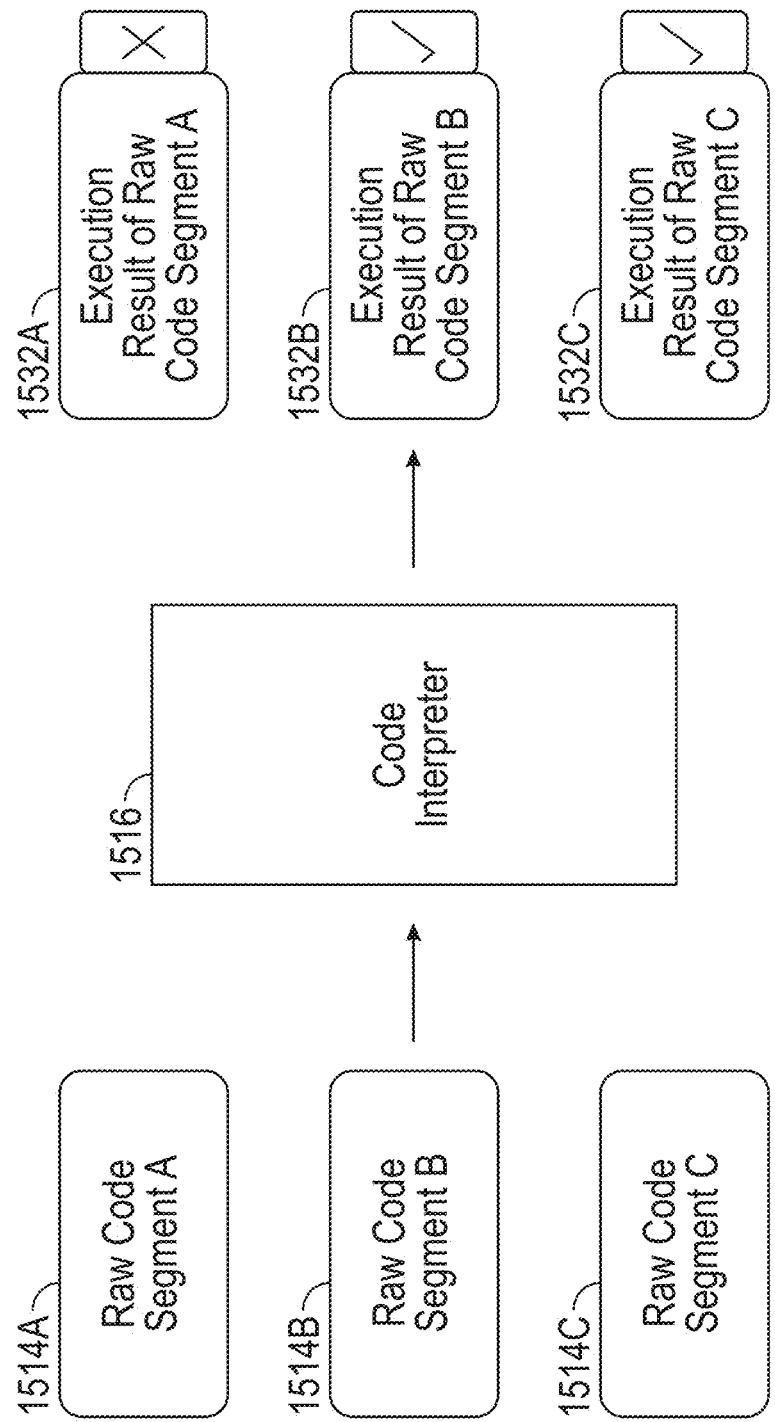
FIG. 15F illustrates an exemplary diagram of a code interpreter processing raw code segments and generating execution results indicative of code interpretability and validity, according to some embodiments of the present technology.

FIG. 15F illustrates an exemplary diagram of a code interpreter processing raw code segments and generating execution results indicative of code interpretability and validity, according to some embodiments of the present technology. In the context of SAS as the target programming language, a code interpreter may be a program that directly executes SAS code without first compiling it into machine code, by reading and executing SAS statements (of the segmented raw code segments 1514) one by one, translating them into machine instructions without compiling. In embodiments where Ada is selected as the target programming language, an interpreter called gnatsh included in a GNU Ada compiler may be used to perform step 1440 of method 1400. In embodiments where Fortran is selected as the target programming language, an interpreter f95int included in the f95 compiler from the GNU Compiler Collection (GCC) may be used to perform step 1440. In embodiments where ABAP is selected as the target programming language, an interpreter in SAP's ABAP Development Tools may be used to perform step 1440. In embodiments where COBOL is selected as the target programming language, one of several available interpreters including commercial and open-source tools may be used to perform step 1440. In embodiments where RPG is selected as the target programming language, an interpreter included in IBM's Rational Developer for iSeries may be used to perform step 1440. In embodiments where LabVIEW is selected as the target programming language, an interactive graphical execution tool may be used to perform step 1440. In embodiments where VHDL is selected as the target programming language, a VHDL simulator may be used to perform step 1440. In embodiments where MATLAB is selected as the target programming language, a proprietary execution engine that allows for interactive execution and debugging of MATLAB code may be used to perform step 1440.

In FIG. 15F, code interpreter 1516 is shown receiving segmented results produced by LLM 1508 and processed by code segmenter 1512, namely raw code segment A 1514A, raw code segment B 1514B, and raw code segment C 1514C. The code interpreter 1516 may execute each of the segmented raw code segments to determine whether the each of the segmented raw code segments are functional, or not (e.g., the segment includes syntax errors, logical errors, incorrect data types, invalid function usage, and/or other runtime errors). For example, the code interpreter 1516 may execute raw code segments A, B, and C 1514A-C and produce a result of the execution for each of the raw code segments (corresponding to process 1440 of method 1400). Execution results of raw code segments A, B, and C 1532A-C may represent results corresponding to the respective raw code segments input to code interpreter 1516.

Based on said execution results, the system performing process 1450 of method 1400 may determine one or more code segments corresponding to the inputs to code interpreter 1516 to be valid. In particular, execution results of raw code segments A, B, and C 1532A-C may indicate whether their corresponding raw code segments executed without errors. In some embodiments, raw code segments may be flagged, tagged, or otherwise designated as functional/valid, or non-functional/invalid code segments in the target programming language based on corresponding execution results from the interpreter.

Execution results 1532A-C produced by the code interpreter may be indicative of successful, or unsuccessful interpretation of the code segments 1514A-C respectively. As one example, when the code interpreter provides execution results of a particular raw code segment that match the expected output value or execution results of said raw code segment, the system performing method 1400 may flag, tag, or otherwise designate the particular raw code segment as being valid. In the example of FIG. 15F, execution result (of raw code segment) B 1532B and execution result (of raw code segment) C 1532C may correspond to results from code interpreter 1516 that correspond to expected results for the execution of raw code segment B 1514B and raw code segment C 1514C, as indicated by their adjacent check mark. Responsive to execution result B 1532B and execution result C 1532C being generated, compared to expected execution results, and determined to match the expected execution results, the system performing process 1450 of method 1400 may determine (and accordingly designate) raw code segment B 1514B and raw code segment C 1514C to be valid code segments. In some embodiments, only those raw code segments provided to code interpreter 1516 that are determined to be valid in this way may be retained in the flow of data illustrated by FIG. 15A (as validated code segments 1518).

In some embodiments, a separate process may be performed on the same system resources that perform method 1400, to determine expected results for raw code segments. As an example, expected results for execution of segmented raw code segments 1514 may be produced by an agentic or other programmatic or autonomous process that uses the segmented raw code segments 1514 themselves, including any comment components associated with the segments (that may explicitly indicate their respective expected results) to prompt LLM 1508, with a request to generate expected results for each of the segmented raw code segments 1514 that can be compared to the actual execution results produced by code interpreter 1516. Such an exemplary embodiment may allow for LLM-generated expected results for each of the segmented raw code segments 1514 to be presented to a user of the system performing method 1400, for optional manual correction or modification of the expected results based on operator expertise.

When code interpreter 1516 is unable to provide expected execution results of a particular raw code segment, the system performing method 1400 may flag, tag, or otherwise designate the particular raw code segment as being invalid. As shown in the exemplary embodiment of FIG. 15F, execution result (of raw code segment) A 1532A may correspond to results from code interpreter 1516 that differ from the expected results for the execution of raw code segment A 1514A, as indicated by its adjacent "X" mark. Responsive to execution result A being generated, compared to expected execution results, and determined to differ (i.e., not match) the expected execution results, the system performing process 1400 may designate corresponding raw code segment A 1514A as invalid, and optionally discard said raw code segment. In some embodiments, if execution result A cannot be generated due to code interpreter 1516 being unable to interpret raw code segment A, then raw code segment A may be designated to be invalid without any comparison to expected results for the interpretation of raw code segment A.

In some embodiments, LLM 1508 may be prompted to perform modifications (indicated by feedback 1509) or changes to the composition of code synthesis prompt, for any reason. As an example, if it is determined (e.g., by code segmenter 1512 in connection with operations of process 1450, discussed above) that some synthetic segmented code segments are invalid, or must be discarded, the system performing method 1400 may prompt large language model 1508 to generate a synthetic code generation prompt for prompting LLM 1508 to modify the synthetic segmented code segments produced by code synthesis prompt 1506, such that new, valid synthetic code segments may be generated to can replace the discarded examples in the set of retained validated code segments 1518. In some embodiments, synthetic code examples that are not validated or designated to be invalid or discardable may be provided to LLM 1508 with a prompt to correct certain errors (e.g., based on errors, warnings, or feedback generated by the interpreter in addition to any results). Feedback 1509 may provide for a representation of LLM 1508 being capable of modifying code synthesis prompt 1506, or generating new code synthesis prompts at any time (e.g., to repair synthetic raw code segments generated by LLM 1508 itself, to reattempt validation of said repaired synthetic raw code segments). In some embodiments in which an original code synthesis prompt 1506 provided to LLM 1508 does not yield an expected number of valid synthetic raw code segments, process 1450 of FIG. 14, for determining validity of synthetic raw code segments may be repeated based on modifications of the original code synthesis prompt, or based on new code synthesis prompts to LLM 1508 based on indications and messages provided by code interpreter 1516, until an expected/predetermined number of validated code segments 1518 is reached.

In identifying a set of validated code segments 1518, the system performing process 1450 of method 1400 may retain associations between the individually valid code segments and the predefined datasets, and boilerplate headers required to interpret the code. The predefined datasets and boilerplate headers associated with individually valid code segments may be provided to code interpreter 1516 (to facilitate validation of raw code segments), and their associations with the individually valid code segments may be maintained (e.g., as metadata, or any other suitable method for tagging code segments) so that the predefined datasets and boilerplate headers may be included during recombination of the valid code segments into validated code synthesis training samples (i.e., datasets and headers relevant to the valid code segments in validated code synthesis training examples may be included in the validated code synthesis training examples as prior context).

Figure 15G:
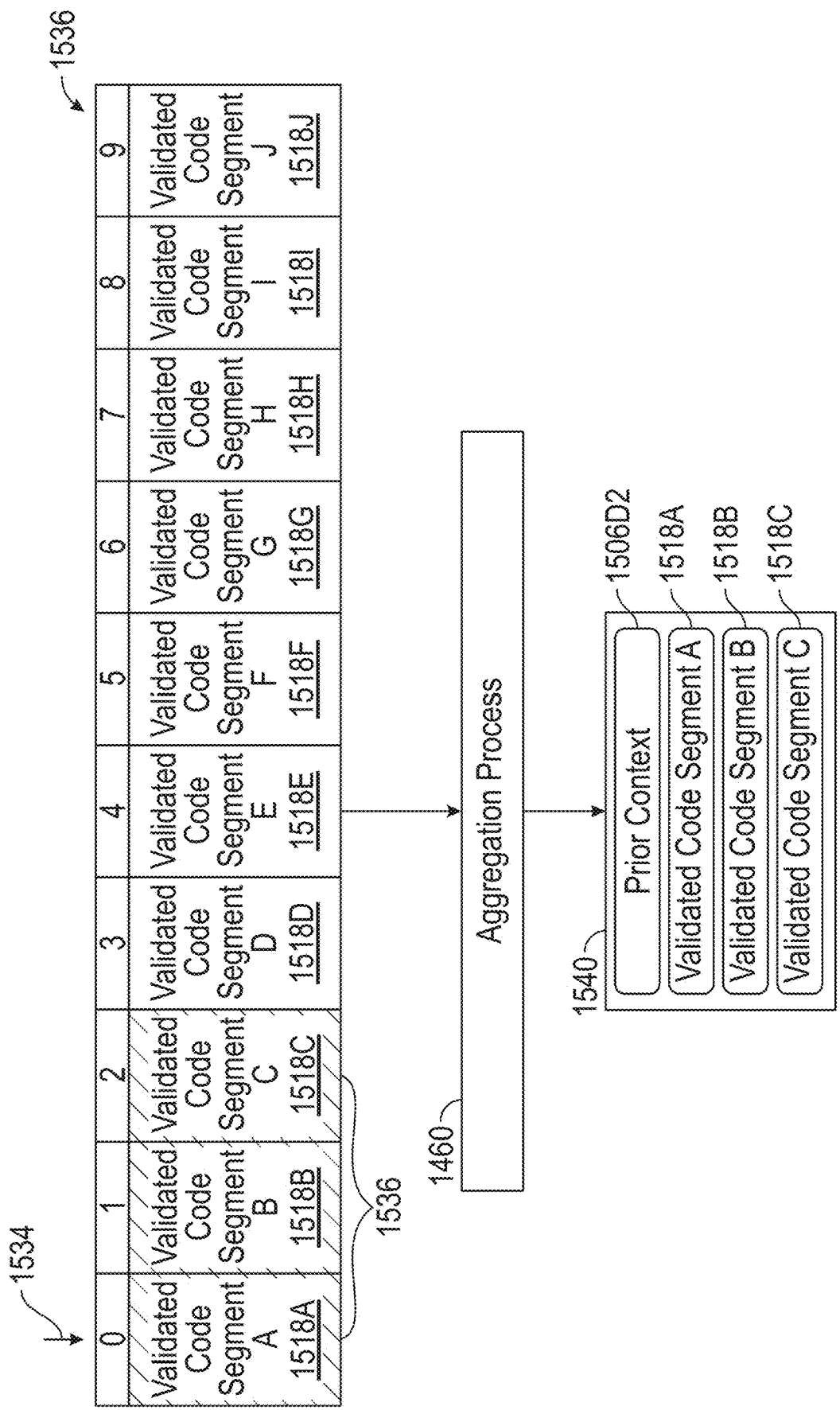
FIG. 15G illustrates an exemplary diagram of an aggregation process for validated code segments producing training data with a first size, according to some embodiments of the present technology.

Following the code validation operations corresponding to process 1450 performed using code interpreter 1516, a set of validated code segments 1518 may be identified and retained for sampling as aggregated training data packets for a code assistant, code completion, or code generation model. FIG. 15G illustrates an exemplary diagram of an aggregation process (sometimes referred to as "recombining" process) for validated code segments producing training data with a first size, according to some embodiments of the present technology. In the context of FIG. 15A, the system component that performs the aggregation or recombining process may be referred to as random sampler C 1504C, and its sampling and aggregation processes may be referred to as a "second" sampling, relative to the "first" sampling operations performed by random sampler A 1504A and random sampler B 1504B in aggregating code synthesis items 1502 to create code synthesis prompt 1506. Validated code segments 1518 may be processed via aggregation process 1460, corresponding to process 1460 of FIG. 14 and its programmatic or automatic aggregation of validated code segments 1518 into one or more validated code synthesis training samples. Aggregation process 1460 may begin with validated code segments 1518 illustrated as having ten component segments 1518A-J, and alternatively indexed as elements 0 through 9 of an array or other data structure of validated code segments.

Aggregation process 1460 may sample from validated code segments 1518A-J based on a starting index 1534 for validated code segments that may be randomly selected, and including a random number of additional code segments from subsequent indices of a data structure representation of validated code segments 1518A-J. Selected code segments may be aggregated, along with prior context corresponding to predefined datasets and boilerplate headers that accompanies the selected code segments to generate training data having a particular size greater than one validated code segment. In some embodiments, the random number of additional code segments from validated code segments 1518A-J may be determined by using a (random selection from a) Poisson distribution of mean 1. In some embodiments, the mean value (assumed to be 1 in the present example) may be a tunable hyperparameter of method 1400. In the example of FIG. 15G, a starting index 1534 begins at validated code segment A 1518A (corresponding to index 0), and a selected set 1536 of validated code segments may include two additional validated code segments (B and C, corresponding to indices 1 and 2) corresponding to a random selection (that returned the value two) from a Poisson distribution with mean value one.

In other words, a list or series of code segments (beginning at starting index 1534) may be included in validated code synthesis training sample 1540 based on a number corresponding to a sampling from Poisson distribution (mean of 1, in an exemplary embodiment). Said number of validated code segments (two, in FIG. 15G), plus one (to account for the validated code segment at starting index 1534) may be placed into a set 1536, which with the prior context may be grouped as a validated code synthesis training sample 1540, which may be one of multiple such validated code synthesis training samples 1540 included in validated code synthesis training samples 1520 of FIG. 15A. Notably, by selecting an additional number of validated code segments based on a sampling from Poisson distribution with mean one, validated code synthesis training sample 1540 may contain at least two component validated code segments (e.g., a first validated code segment corresponding to the position of starting index 1534, and at least one code segment corresponding to the mean value of the Poisson distribution sample used to determine a number of additional validated code segments to include in validated code synthesis training sample 1540).

Using a Poisson distribution with mean value one in an exemplary embodiment may encourage short generations to be presented to a code generation model in its corpus of training data composed of validated code synthesis training samples (e.g., 1540), as opposed to keeping all of the (ten) validated code segments 1518A-J (illustrated in FIG. 15G) within validated code synthesis training samples, which may result in a trained code generator model returning ten different examples in response to a user prompt or comment (e.g., displaying excess example generations in response to a user prompt or comment). In other embodiments, random distributions other than the Poisson distribution may be used, such as a binomial distribution, negative binomial distribution, or geometric distribution. In general, any random distribution with a positive skew, and a majority of occurrences within the range of the number of available validated code segments may be used to sample code segments for inclusion in validated code synthesis training sample 1540. By sampling multiple validated code segments 1518A-J instead of separating each example, random sampler C 1504C (or aggregation process 1460) may produce validated code synthesis training samples 1540 that can train a code generation model to encounter scenarios where more than one use of a particular function or procedure may be occur in the prior context provided to the code generation model. Said multi-segment sampling for inclusion in validated code synthesis training samples 1540 may prevent the generator from being destabilized if/when it encounters a novel scenario, situation, or arrangement in which a user may have already loaded a dataset and performed some operations (requiring a trained code assistant/generation model to align its completions responsive to user prompts with said user operations and their respective results). In some embodiments, validated code synthesis training sample 1540 may also include prior context 1506D2 corresponding to the programmatic resources that the validated code segments of the set of training samples (i.e., the selection of 1518A-J) depend on or from.

Figure 15H:
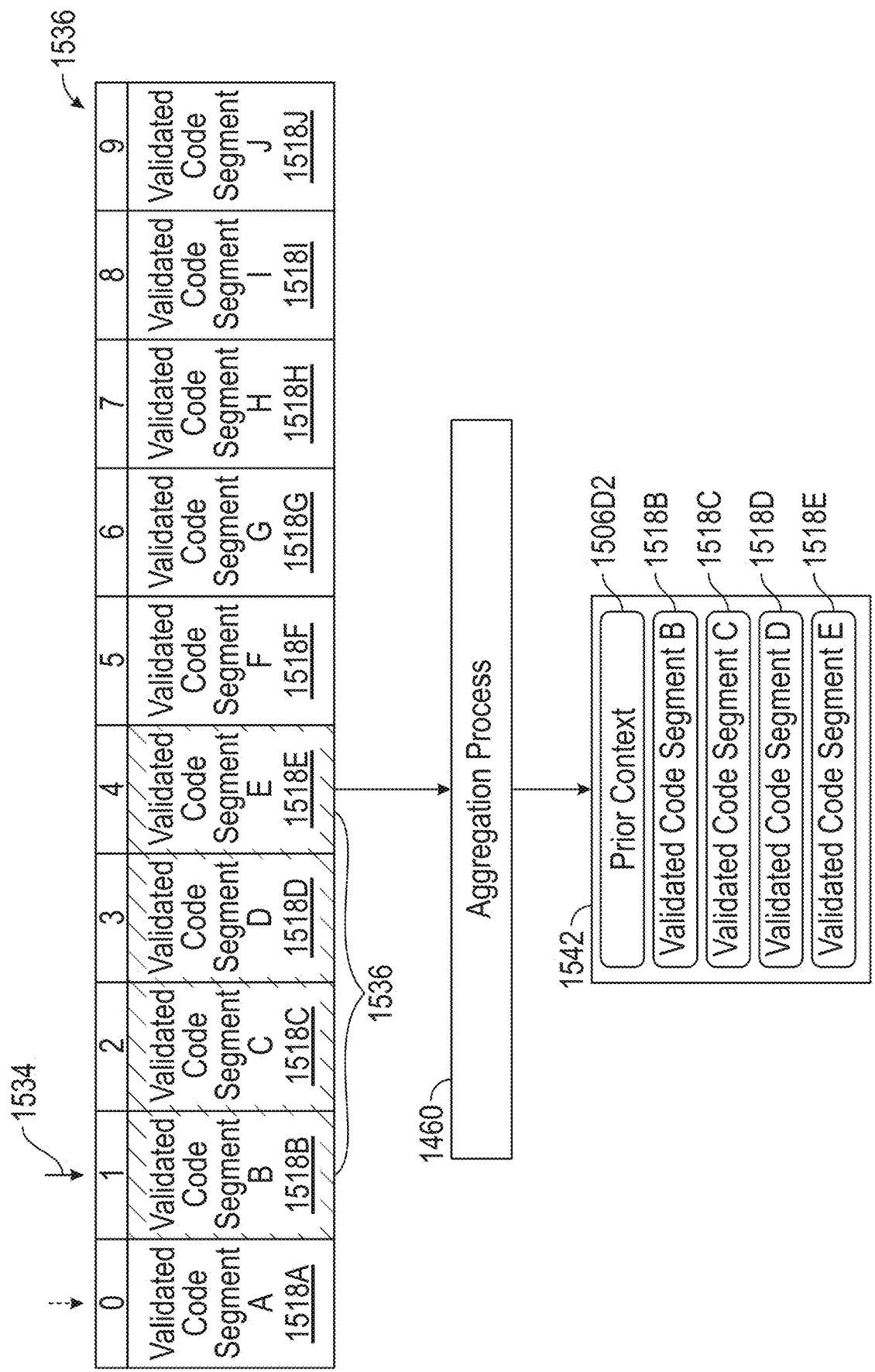
FIG. 15H illustrates an exemplary diagram of an aggregation process for validated code segments producing training data with a first size, according to some embodiments of the present technology.

FIG. 15H illustrates an exemplary diagram of an aggregation process for validated code segments producing training data with a second size, according to some embodiments of the present technology. Relative to FIG. 15G, FIG. 15H may illustrate a shift in starting index 1534 from validated code segment A 1518A at index 0, to validated code segment B 1518B at index 1. Shifting starting index 1534 may be an operation performed by random sampler C 15104C, or may be performed periodically (i.e., each new validated code synthesis training sample 1540 may have a new starting index). A list or series of code segments (beginning at starting index 1534) may be included in validated code synthesis training sample 1540 based on a number corresponding to a sampling from Poisson distribution (mean of 1, in an exemplary embodiment). Said number (three, in FIG. 15F) of validated code segments, plus one (to account for the validated code segment at starting index 1534) may be placed into a set 1536, which with the prior context may be grouped as a validated code synthesis training sample 1540, which may be one of multiple such validated code synthesis training samples 1540 included in validated code synthesis training samples 1520 of FIG. 15A. Following aggregation process 1460, method 1400 may proceed to process 1470, which may function to train a code generation model using the one or more validated code synthesis training samples 1520 of FIG. 15A using any commonly accepted code generation model training framework (e.g., a supervised learning framework that causes the code generation model to map natural language descriptions of a target coding task to the one or more validated code segments that implements the target coding task). In some embodiments, mechanisms of a large language model (e.g., embedding, key, query, value, attention mechanisms) present in a code generation model trained using the one or more validated code synthesis training samples 1520 using a supervised learning framework may undergo transformation based on one or more validated code synthesis training samples 1520 during training operations. Internal data structures maintained on non-transitory storage by a large language model associated with and present within the code generation model may be transformed during the learning process in which validated code synthesis training samples 1520 may be provided to the code generation in connection with supervised learning operations.

In some embodiments, the code generation model may be configured to receive natural language input specifying a target coding task, and to generate code in the target programming language that implements the target coding task. In some embodiments, method 1400 may further include steps relating to receiving an input specifying a target coding task in natural language, and based on receiving the input: providing, to the code generation model, a prompt that comprises the input, and returning, via the code generation model, a response to the prompt that includes code implementing the target coding task in the target programming language. In some embodiments, method 1400 may further include steps whereby input corresponding to the target coding task may be received via an interface in operative communication with the code generation model, and whereby a response to the prompt may include: displaying the response to the prompt via the interface in operative communication with the code generation model. In some embodiments, the interface in operative communication with the code generation model may be one of: a command line interface (CLI), an application programming interface (API), or a graphical user interface (GUI). In some embodiments, the interface in operative communication with the code generation model may be an audio interface capable of performing speech-to-text and natural language processing (NLP) operations on voice input to enable human speech to be used as input to the code generation model. In some embodiments, the interface in operative communication with the code generation model may be an integrated development environment (IDE) capable of providing portions of code from a codebase as context to the code generation model, in addition to the target coding task provided to the code generation model as input.

Figure 15I:
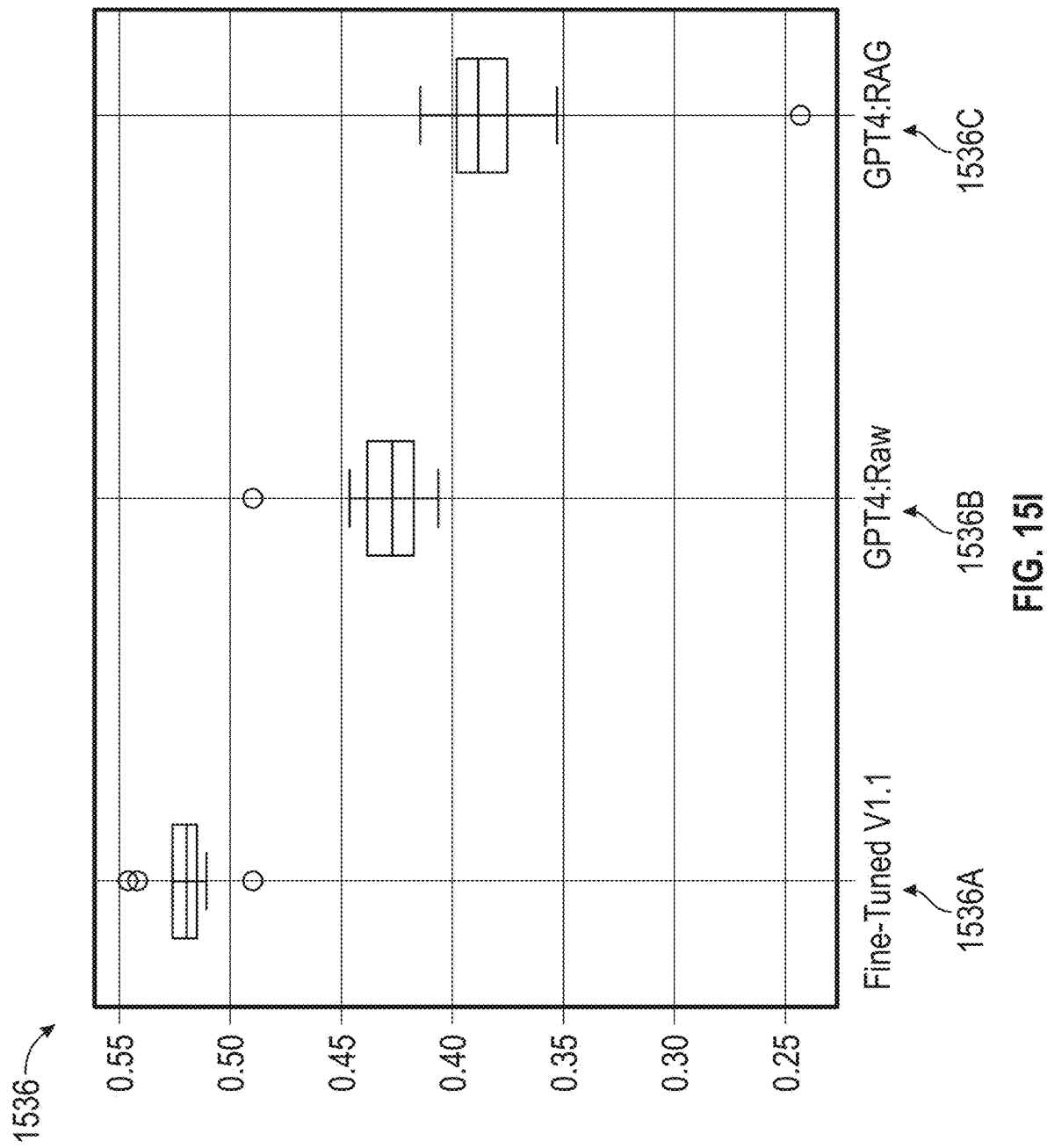
FIG. 15I illustrates a comparison of the performance of the present technology with currently-available user-assistant tools, according to some embodiments of the present technology.

FIG. 15I illustrates a comparison of the performance of the present technology with currently-available user-assistant tools, according to some embodiments of the present technology. As shown by the box plots of FIG. 15I, the fine-tuned models of the embodiments presented herein may consistently outperform raw GPT-4 (GPT4:Raw) and retrieval augmented GPT-4 (GPT4:RAG) in the task of writing valid SAS code (or, providing code assistant completions) in response to various user prompts. Another comparison may be made, between the fine-tuned models of the presented embodiments and GitHub Copilot X, based on a macro average of correct code assistant completions provided to a number of user prompts for functional SAS code corresponding to various different functions (using a metric that accounts for different levels of correctness, to enable the awarding of "partial-credit" to code assistant completions that are not completely correct or aligned with an expected result for the generated code). A macro average metric may provide an equal weighting to evaluations of various unique requested functionalities in the target programming language, regardless of the sample size of assistant completions available for said requested functionalities (e.g., a first requested functionality with three available assistant completions may be evaluated, and may be given a score that is given equal weight with an evaluation score for a second requested functionality with thirty available assistant completions). GitHub Copilot X may have a macro average metric for SAS code of 0.3314, corresponding to roughly 33% average accuracy across all requested functionalities in SAS. The fine-tuned models of the present embodiments may have a macro average metric for SAS code of 0.4338, corresponding to roughly 43% average accuracy across all requested functionalities in SAS, representing a 10% improvement in performance relative to GitHub Copilot X.

It shall be noted that the system and methods described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
   identifying a plurality of code synthesis items for a target programming language;
   generating a code synthesis prompt based on a first sampling of the plurality of code synthesis items;
   synthesizing, via a large language model, a plurality of raw code segments using the code synthesis prompt;

executing the plurality of raw code segments with a code interpreter associated with the target programming language;

determining one or more valid code segments of the plurality of raw code segments that the code interpreter successfully executed;

aggregating, via a second sampling, the one or more valid code segments into one or more validated code synthesis training samples, wherein a respective validated code synthesis training sample of the one or more validated code synthesis training samples at least includes:
- a natural language description of a target coding task, and
- one or more code segments that implement the target coding task; and training a code generation model using the one or more validated code synthesis training samples, wherein:
- the training the code generation model includes using supervised learning to train the code generation model;
- the supervised learning causes the code generation model to learn to map the natural language description of the target coding task to the one or more code segments that implement the target coding task.

2. The computer-program product according to claim 1, wherein:
the one or more valid code segments are stored in an iterable data structure,
aggregating the one or more valid code segments into the one or more validated code synthesis training samples includes iterating through one or more indices of the iterable data structure, and
an iteration for a first respective index of the iterable data structure includes:
- determining, via the second sampling, a first number of valid code segments to obtain from the iterable data structure,
- obtaining, from the iterable data structure, a first set of valid code segments starting from the first respective index and corresponding to the first number of valid code segments, and
- generating a first validated code synthesis training sample that includes the first set of valid code segments obtained from the iterable data structure.

3. The computer-program product according to claim 2, wherein the second sampling uses a Poisson distribution to determine the first number of valid code segments to obtain from the iterable data structure.

4. The computer-program product according to claim 2, wherein:
the code synthesis prompt includes a partial user-assistant code completion pair that specifies prior context data, including:
- a pre-defined boilerplate header associated with the target programming language, and
- pre-defined code for instantiating a respective dataset in the target programming language, and
generating the first validated code synthesis training sample further includes:
- pre-pending the pre-defined boilerplate header and the pre-defined code to the first validated code synthesis training sample.

5. The computer-program product according to claim 2, wherein:
an iteration for a second respective index of the iterable data structure includes:
- determining, via the second sampling, a second number of valid code segments to obtain from the iterable data structure,
- obtaining, from the iterable data structure, a second set of valid code segments starting from the second respective index and corresponding to the second number of valid code segments, and
- generating a second validated code synthesis training sample, different from the first validated code synthesis training sample, that includes the second set of valid code segments obtained from the iterable data structure.

6. The computer-program product according to claim 1, wherein generating the code synthesis prompt includes:
generating a system message,
generating one or more simulated user-assistant code completion pairs for one or more features of the target programming language, and
generating a partial user-assistant code completion pair for a respective feature of the target programming language.

7. The computer-program product according to claim 6, wherein:
the plurality of code synthesis items includes a collection of example code segments for the respective feature of the target programming language, and
generating a respective simulated user-assistant code completion pair based on the first sampling of the plurality of code synthesis items includes:
- generating a simulated user message that instructs the large language model to synthesize a respective number of the example code segments for the respective feature of the target programming language;
- randomly sampling the respective number of the example code segments from the collection of the example code segments; and
- generating a simulated code assistant response message that responds to the simulated user message with the respective number of the example code segments randomly sampled from the collection of the example code segments.

8. The computer-program product according to claim 6, wherein:
the plurality of code synthesis items includes a collection of datasets instantiated in the target programming language and a pre-defined boilerplate header for the target programming language; and
generating the partial user-assistant code completion pair based on the first sampling of the plurality of code synthesis items includes:
- randomly sampling a dataset from the collection of datasets instantiated in the target programming language;
- generating a user message that instructs the large language model to synthesize a respective number of example code segments for the respective feature of the target programming language using the dataset randomly sampled from the collection of datasets; and
- adding, to the user message, prior context data that includes the pre-defined boilerplate header for the target programming language and pre-defined code for instantiating the dataset in the target programming language.

9. The computer-program product according to claim 6, wherein:

generating the system message includes adding one or more instructions to the system message, and the one or more instructions of the system message instruct the large language model to:
  operate as the code generation model,
  produce self-contained code that adheres to syntactical requirements of the target programming language, and
  generate comments for the self-contained code that explain one or more features of the self-contained code.

10. The computer-program product according to claim 6, wherein a respective simulated user-assistant code completion pair of the one or more simulated user-assistant code completion pairs includes:
  a simulated user message that instructs the large language model to synthesize a respective number of code segments for a target feature of the target programming language, and
  a simulated code assistant response message that responds to the simulated user message with the respective number of code segments.

11. The computer-program product according to claim 1, wherein the plurality of code synthesis items include:
  a collection of example code segments for a respective feature of the target programming language,
  a collection of datasets instantiated in the target programming language, and
  a pre-defined boilerplate header for the target programming language.

12. The computer-program product according to claim 1, wherein:
  the code synthesis prompt includes a partial user-assistant code completion pair that instructs the large language model to synthesize a respective number of example code segments for a respective feature of the target programming language, and
  synthesizing, via the large language model, the plurality of raw code segments using the code synthesis prompt includes:
    synthesizing the plurality of raw code segments based on the respective number of the example code segments requested for the respective feature in the partial user-assistant code completion pair.

13. The computer-program product according to claim 1, wherein:
  synthesizing the plurality of raw code segments includes synthesizing a code assistant response message that includes the plurality of raw code segments, and
  the computer instructions, when executed by the one or more processors, perform operations further comprising:
    extracting the plurality of raw code segments from the code assistant response message.

14. The computer-program product according to claim 13, wherein:
  the code assistant response message separates the plurality of raw code segments by code comments, and
  extracting the plurality of raw code segments from the code assistant response message includes:
    extracting the plurality of raw code segments using the code comments as delimiters.

15. The computer-program product according to claim 1, wherein:
  the code synthesis prompt includes a partial user-assistant code completion pair that specifies prior context data, and
  executing a respective raw code segment of the plurality raw code segments with the code interpreter includes:
    providing the respective raw code segment and the prior context data to the code interpreter, and
    executing, via the code interpreter, the respective raw code segment in association with the prior context data.

16. The computer-program product according to claim 15, wherein the prior context data specified within the partial user-assistant code completion pair includes:
  a pre-defined boilerplate header associated with the target programming language, and
  pre-defined code for instantiating a respective dataset in the target programming language.

17. The computer-program product according to claim 1, wherein a respective valid code segment corresponds to a raw code segment of the plurality of raw code segments that executed in the code interpreter without an error.

18. The computer-program product according to claim 1, wherein:
  the code generation model receives natural language input specifying a target coding task, and generates code in the target programming language that implements the target coding task.

19. The computer-program product according to claim 1, wherein the computer instructions, when executed by the one or more processors, perform operations further comprising:
  receiving, via an interface in operative communication with the code generation model, an input specifying a target coding task in natural language, and
  based on receiving the input:
    providing, to the code generation model, a prompt that comprises the input, and
    returning, via the code generation model, a response to the prompt that includes code implementing the target coding task in the target programming language by:
      displaying the response to the prompt via the interface in operative communication with the code generation model, wherein the interface in operative communication with the code generation model is one of:
        a command line interface (CLI),
        an application programming interface (API), or
        a graphical user interface (GUI).

20. The computer-program product according to claim 1, wherein the one or more validated code synthesis training samples further include:
  a first code segment that includes comments explaining features or steps for completing the first code segment;
  a dataset instantiated in the target programming language with annotations describing relationships or structures within the dataset;
  a second code segment illustrating incorrect implementations and corresponding corrections in the target programming language;
  a pair of code segments, wherein one code segment is in the target programming language and the other is an equivalent implementation in a second programming language; or
  a third code segment pre-pended with a pre-defined boilerplate header or pre-defined code for initializing libraries, modules, or datasets in the target programming language.

21. The computer-program product according to claim 1, wherein the plurality of code synthesis items includes at least one of:
- a collection of datasets instantiated in the target programming language;
- pre-defined boilerplate code associated with the target programming language; or
- library references or module initialization code specific to the target programming language.

22. A computer-implemented method comprising:
- identifying a plurality of code synthesis items for a target programming language;
- generating a code synthesis prompt based on a first sampling of the plurality of code synthesis items;
- synthesizing, via a large language model, a plurality of raw code segments using the code synthesis prompt;
- executing the plurality of raw code segments with a code interpreter associated with the target programming language;
- determining one or more valid code segments of the plurality of raw code segments that the code interpreter successfully executed;
- aggregating, via a second sampling, the one or more valid code segments into one or more validated code synthesis training samples, wherein a respective validated code synthesis training sample of the one or more validated code synthesis training samples at least includes:
  - a natural language description of a target coding task, and
  - one or more code segments that implement the target coding task; and
- training a code generation model using the one or more validated code synthesis training samples, wherein:
  - the training the code generation model includes using supervised learning to train the code generation model; and
  - the supervised learning causes the code generation model to learn to map the natural language description of the target coding task to the one or more code segments that implement the target coding task.

23. The computer-implemented method according to claim 22, wherein generating the code synthesis prompt includes:
- generating a system message,
- generating one or more simulated user-assistant code completion pairs for one or more features of the target programming language, and
- generating a partial user-assistant code completion pair for a respective feature of the target programming language.

24. The computer-implemented method according to claim 23, wherein:
- the plurality of code synthesis items includes a collection of example code segments for the respective feature of the target programming language, and
- generating a respective simulated user-assistant code completion pair based on the first sampling of the plurality of code synthesis items includes:
  - generating a simulated user message that instructs the large language model to synthesize a respective number of example code segments for the respective feature of the target programming language;
  - randomly sampling the respective number of example code segments from the collection of example code segments; and
  - generating a simulated code assistant response message that responds to the simulated user message with the respective number of example code segments randomly sampled from the collection of example code segments.

25. The computer-implemented method according to claim 23, wherein:
- the plurality of code synthesis items includes a collection of datasets instantiated in the target programming language and a pre-defined boilerplate header for the target programming language; and
- generating the partial user-assistant code completion pair based on the first sampling of the plurality of code synthesis items includes:
  - randomly sampling a dataset from the collection of datasets instantiated in the target programming language;
  - generating a user message that instructs the large language model to synthesize a respective number of example code segments for the respective feature of the target programming language using the dataset randomly sampled from the collection of datasets; and
  - adding, to the user message, prior context data that includes the pre-defined boilerplate header for the target programming language and pre-defined code for instantiating the dataset in the target programming language.

26. The computer-implemented method according to claim 23, wherein:
- generating the system message includes adding one or more instructions to the system message, and
- the one or more instructions of the system message instruct the large language model to:
  - operate as a code generation model,
  - produce self-contained code that adheres to syntactical requirements of the target programming language, and
  - generate comments for the self-contained code that explain one or more features of the self-contained code.

27. The computer-implemented method according to claim 23, wherein a respective simulated user-assistant code completion pair of the one or more simulated user-assistant code completion pairs includes:
- a simulated user message that instructs the large language model to synthesize a respective number of code segments for a target feature of the target programming language, and
- a simulated code assistant response message that responds to the simulated user message with the respective number of code segments.

28. A computer-implemented system comprising:
- one or more processors;
- a memory;
- a computer-readable medium operably coupled to the one or more processors, the computer-readable medium having computer-readable instructions stored thereon that, when executed by the one or more processors, cause a computing device to perform operations comprising:
  - identifying a plurality of code synthesis items for a target programming language;
  - generating a code synthesis prompt based on a first sampling of the plurality of code synthesis items;
  - synthesizing, via a large language model, a plurality of raw code segments using the code synthesis prompt;

executing the plurality of raw code segments with a code interpreter associated with the target programming language;

determining one or more valid code segments of the plurality of raw code segments that the code interpreter successfully executed;

aggregating, via a second sampling, the one or more valid code segments into one or more validated code synthesis training samples, wherein a respective validated code synthesis training sample of the one or more validated code synthesis training samples at least includes:
- a natural language description of a target coding task, and
- one or more code segments that implement the target coding task; and training a code generation model using the one or more validated code synthesis training samples, wherein:
- the training the code generation model includes using supervised learning to train the code generation model; and
- the supervised learning causes the code generation model to learn to map the natural language description of the target coding task to the one or more code segments that implement the target coding task.

29. The computer-implemented system according to claim 28, wherein:
the code generation model receives natural language input specifying a target coding task, and to generate code in the target programming language that implements the target coding task.

30. The computer-implemented system according to claim 28, wherein the operations further comprise:
receiving, via an interface in operative communication with the code generation model, an input specifying a target coding task in natural language, and based on receiving the input:
providing, to the code generation model, a prompt that comprises the input, and returning, via the code generation model, a response to the prompt that includes code implementing the target coding task in the target programming language by:
displaying the response to the prompt via the interface in operative communication with the code generation model, wherein the interface in operative communication with the code generation model is one of:
a command line interface (CLI),
an application programming interface (API), or
a graphical user interface (GUI).

* * * * *